United States Patent
Howard et al.

(10) Patent No.: US 10,638,198 B2
(45) Date of Patent: Apr. 28, 2020

(54) SHOPPABLE VIDEO

(71) Applicant: eBay Inc., San Jose, CA (US)

(72) Inventors: Dane Howard, Los Gatos, CA (US); Darren Endo, Walnut Creek, CA (US); Seyed-Mahdi Pedramrazi, Santa Clara, CA (US); Gregory Tariff, San Jose, CA (US); Sandra Lynn Godsey, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/159,352

(22) Filed: Jan. 20, 2014

(65) Prior Publication Data
US 2014/0282743 A1     Sep. 18, 2014

Related U.S. Application Data

(60) Provisional application No. 61/800,702, filed on Mar. 15, 2013, provisional application No. 61/906,869, filed on Nov. 20, 2013.

(51) Int. Cl.
*H04N 21/478* (2011.01)
*H04N 21/4725* (2011.01)
(Continued)

(52) U.S. Cl.
CPC . *H04N 21/47815* (2013.01); *H04N 21/44222* (2013.01); *H04N 21/4725* (2013.01); *H04N 21/8583* (2013.01)

(58) Field of Classification Search
CPC ....... H04N 21/47815; H04N 21/44222; H04N 21/4725
(Continued)

(56) References Cited

U.S. PATENT DOCUMENTS

| 5,336,870 A | 8/1994 | Hughes et al. |
| 5,432,542 A | 7/1995 | Thibadeau et al. |

(Continued)

FOREIGN PATENT DOCUMENTS

| CN | 105684016 | 6/2016 |
| EP | 3005272 A2 | 4/2016 |

(Continued)

OTHER PUBLICATIONS

"U.S. Appl. No. 13/409,726, Appeal Brief filed Oct. 23, 2013", 18 pgs.

(Continued)

*Primary Examiner* — Jefferey F Harold
*Assistant Examiner* — Omer Khalid
(74) *Attorney, Agent, or Firm* — Mintz Levin Cohn Ferris Glovsky and Popeo, P.C.

(57) ABSTRACT

Techniques for facilitating shopping for items shown or used in a video are described. For example, a user interface that includes a video and one or more images is presented. Each of the one or more images may be related to a content of the video. Each of the one or more images may include a plurality of selectable sub-areas. A selection of a sub-area of the plurality of sub-areas of an image of the one or more images is received. The selection of the sub-area may indicate a request to perform an action that pertains to the content of the video. The action is identified based on the selection of the sub-area. The action is performed in response to the selection of the sub-area.

18 Claims, 18 Drawing Sheets

(51) Int. Cl.
  *H04N 21/858* (2011.01)
  *H04N 21/442* (2011.01)
(58) Field of Classification Search
  USPC ............... 725/60, 39, 40, 41, 42, 43, 44, 61
  See application file for complete search history.

(56) References Cited

U.S. PATENT DOCUMENTS

| | | |
|---|---|---|
| 7,103,908 B2 | 9/2006 | Tomsen |
| 7,212,829 B1 | 5/2007 | Lau |
| 7,792,709 B1 | 9/2010 | Trandal et al. |
| 7,882,006 B2 | 2/2011 | Gardner et al. |
| 8,180,689 B2 | 5/2012 | Bezos et al. |
| 8,195,526 B2 | 6/2012 | Williams |
| 8,392,276 B1 | 3/2013 | Saltzman et al. |
| 8,401,914 B1 | 3/2013 | Kim |
| 8,418,919 B1 | 4/2013 | Beyda |
| 8,503,995 B2 | 8/2013 | Ramer et al. |
| 8,577,880 B1 | 11/2013 | Donsbach et al. |
| 8,595,073 B2 | 11/2013 | Sprigg et al. |
| 8,666,376 B2 | 3/2014 | Ramer et al. |
| 8,744,929 B2 | 6/2014 | Bezos et al. |
| 8,774,777 B2 | 7/2014 | Ramer et al. |
| 9,356,819 B2 | 5/2016 | Bleecher Snyder et al. |
| 9,390,448 B2 | 7/2016 | Chien et al. |
| 9,483,790 B2 | 11/2016 | Marshall et al. |
| 9,674,576 B2 | 6/2017 | Hosein et al. |
| 9,830,632 B2 | 11/2017 | Lenahan et al. |
| 2004/0194148 A1 | 9/2004 | Schultz et al. |
| 2005/0055640 A1 | 3/2005 | Alten |
| 2005/0120391 A1 | 6/2005 | Haynie et al. |
| 2005/0149987 A1 | 7/2005 | Boccon-Gibod et al. |
| 2007/0085858 A1 | 4/2007 | Takimoto et al. |
| 2007/0089136 A1 | 4/2007 | Kumai et al. |
| 2008/0039212 A1 | 2/2008 | Ahlgren et al. |
| 2008/0040233 A1 | 2/2008 | Wildman et al. |
| 2008/0098450 A1 | 4/2008 | Wu et al. |
| 2008/0215456 A1 | 9/2008 | West et al. |
| 2008/0237340 A1 | 10/2008 | Emmons et al. |
| 2008/0244638 A1 | 10/2008 | Ryden |
| 2008/0259222 A1 | 10/2008 | Hardacker et al. |
| 2009/0187492 A1 | 7/2009 | Hammad et al. |
| 2009/0313142 A1 | 12/2009 | Hiruma et al. |
| 2009/0327894 A1* | 12/2009 | Rakib ................... G11B 27/34 715/719 |
| 2010/0036670 A1 | 2/2010 | Hill et al. |
| 2010/0044430 A1 | 2/2010 | Song et al. |
| 2010/0205167 A1 | 8/2010 | Tunstall et al. |
| 2010/0229196 A1 | 9/2010 | Lee et al. |
| 2011/0032191 A1 | 2/2011 | Cooke et al. |
| 2011/0076941 A1 | 3/2011 | Taveau et al. |
| 2011/0078628 A1* | 3/2011 | Rosenberg ............. G06Q 30/02 715/811 |
| 2011/0099069 A1* | 4/2011 | Hoelz ................... G06Q 30/02 705/14.55 |
| 2011/0215138 A1 | 9/2011 | Crum |
| 2011/0217994 A1 | 9/2011 | Hirson et al. |
| 2011/0247042 A1 | 10/2011 | Mallinson |
| 2011/0321071 A1 | 12/2011 | McRae |
| 2012/0129552 A1 | 5/2012 | Skybey |
| 2012/0173351 A1 | 7/2012 | Hanson et al. |
| 2012/0203664 A1 | 8/2012 | Torossian et al. |
| 2012/0209749 A1 | 8/2012 | Hammad et al. |
| 2012/0227073 A1 | 9/2012 | Hosein et al. |
| 2012/0290421 A1 | 11/2012 | Qawami et al. |
| 2012/0293305 A1 | 11/2012 | Shaw et al. |
| 2013/0018726 A1 | 1/2013 | Ionescu et al. |
| 2013/0051754 A1* | 2/2013 | Gilpin ................ H04N 21/4756 386/241 |
| 2013/0080279 A1 | 3/2013 | Daily et al. |
| 2013/0153655 A1 | 6/2013 | Dawkins |
| 2013/0283301 A1* | 10/2013 | Avedissian ....... H04N 21/44016 725/5 |
| 2013/0311328 A1 | 11/2013 | Chien et al. |
| 2013/0317923 A1 | 11/2013 | Capps et al. |
| 2014/0068670 A1* | 3/2014 | Timmermann .. H04N 21/44008 725/40 |
| 2014/0100991 A1 | 4/2014 | Lenahan et al. |
| 2014/0108247 A1 | 4/2014 | Artman et al. |
| 2014/0365341 A1 | 12/2014 | Maclaurin et al. |
| 2015/0094080 A1 | 4/2015 | Bleecher Snyder et al. |
| 2018/0089735 A1 | 3/2018 | Lenahan et al. |

FOREIGN PATENT DOCUMENTS

| | | |
|---|---|---|
| JP | 2009151412 | 7/2009 |
| JP | 2009301297 | 12/2009 |
| KR | 1020100009150 | 1/2010 |
| KR | 1020120102304 | 9/2012 |
| WO | WO-2012118976 A2 | 9/2012 |
| WO | 2014197627 | 12/2014 |

OTHER PUBLICATIONS

"U.S. Appl. No. 13/409,726, Decision on Appeal Brief dated Sep. 23, 2013", 2 pgs.
"U.S. Appl. No. 13/409,726, Examiner's Answer dated Jan. 31, 2014", 16 pgs.
"U.S. Appl. No. 13/409,726, Final Office Action dated Jun. 4, 2013", 14 pgs.
"U.S. Appl. No. 13/409,726, Non Final Office Action dated Jan. 16, 2013", 14 pgs.
"U.S. Appl. No. 13/409,726, Pre-Appeal Brief Request filed Aug. 5, 2013", 5 pgs.
"U.S. Appl. No. 13/409,726, Reply Brief filed Mar. 31, 2014", 5 pgs.
"U.S. Appl. No. 13/409,726, Response filed Apr. 15, 2013 to Non Final Office Action dated Jan. 16, 2013", 13 pgs.
"International Application Serial No. PCT/US2012/027292, International Preliminary Report on Patentability dated Mar. 13, 2014", 7 pgs.
"International Application Serial No. PCT/US2012/027292, Search Report dated Jun. 7, 2012", 2 pgs.
"International Application Serial No. PCT/US2012/027292, Written Opinion dated Jun. 7, 2012", 5 pgs.
"U.S. Appl. No. 13/409,726, Appeal Decision dated Jun. 2, 2016", 9 pgs.
"U.S. Appl. No. 13/409,726, Examiner Interview Summary dated Aug. 4, 2016", 3 pgs.
"U.S. Appl. No. 13/409,726, Examiner Interview Summary dated Sep. 26, 2016", 3 pgs.
"U.S. Appl. No. 13/409,726, Non Final Office Action dated Aug. 25, 2016", 14 pgs.
"U.S. Appl. No. 13/409,726, Notice of Allowance dated Jan. 31, 2017", 7 pgs.
"U.S. Appl. No. 13/409,726, Response filed Aug. 1, 2016 to Final Office Action dated Jun. 4, 2013", 10 pgs.
"U.S. Appl. No. 13/409,726, Response filed 10-0716 to Non Final Office Action dated Aug. 25, 2016", 11 pgs.
"U.S. Appl. No. 14/051,375, Non Final Office Action dated Jan. 19, 2017", 11 pgs.
"U.S. Appl. No. 14/051,375, Notice of Non-Compliant Amendment dated Oct. 7, 2016", 2 pgs.
"U.S. Appl. No. 14/051,375, Response filed Oct. 3, 2016 to Restriction Requirement dated Aug. 17, 2016", 7 pgs.
"U.S. Appl. No. 14/051,375, Response filed Oct. 31, 2016 to Notice of Non-Compliant Amendment dated Oct. 7, 2016", 6 pgs.
"U.S. Appl. No. 14/051,375, Restriction Requirement dated Aug. 17, 2016", 7 pgs.
"U.S. Appl. No. 14/051,375, Corrected Notice of Allowance dated Jul. 28, 2017", 4 pgs.
"U.S. Appl. No. 14/051,375, Notice of Allowance dated Jul. 14, 2017", 7 pgs.
"U.S. Appl. No. 14/051,375, Response filed Apr. 19, 2017 to Non Final Office Action dated Jan. 19, 2017", 13 pgs.
Preliminary Amendment for U.S. Appl. No. 15/802,352, filed on Nov. 28, 2017, 8 pages.

(56) References Cited

OTHER PUBLICATIONS

"International Application Serial No. PCT US2014 040952, International Search Report dated Oct. 9, 2014", 2 pgs.
"International Application Serial No. PCT US2014 040952, Written Opinion dated Oct. 9, 2014", 5 pgs.
"International Application Serial No. PCT US2014 040952, International Preliminary Report on Patentability dated Dec. 17, 2015", 7 pgs.
"European Application Serial No. 14807509.6, Response filed Feb. 10, 2016", 13 pgs.
"European Application Serial No. 14807509.6, Communication pursuant to Rules 161(2) and 162 EPC dated Jan. 19, 2016", 2 pgs.
"U.S. Appl. No. 14/109,737, Restriction Requirement dated May 20, 2016", 5 pgs.
"Australian Application Serial No. 2014274905, First Examiner Report dated Aug. 17, 2016", 3 pgs.
"U.S. Appl. No. 14/109,737, Response filed Sep. 9, 2016 to Restriction Requirement dated May 20, 2016", 10 pgs.
"Korean Application Serial No. 2016-7000111, Office Action dated Sep. 19, 2016", (w English Claims), 14 pages.
"U.S. Appl. No. 14/109,737, Non Final Office Action dated Dec. 5, 2016", 13 pgs.
"European Application Serial No. 14807509.6, Extended European Search Report dated Nov. 22, 2016", 6 pgs.
"Canadian Application Serial No. 2,913,994, Office Action dated Nov. 30, 2016", 4 pgs.
"Korean Application Serial No. 2016-7000111, Response filed Dec. 16, 2016 to Office Action dated Sep. 19, 2016", (English Translation of Claims), 31 pgs.
"Australian Application Serial No. 2014274905, Response filed Jan. 18, 2017 to First Examiner Report dated Aug. 17, 2016", 21 pgs.
"U.S. Appl. No. 14/109,737, Response Filed Mar. 6, 2017 to Non Final Office Action dated Dec. 5, 2016", 20 pgs.
"Australian Application Serial No. 2014274905, Subsequent Examiners Report dated Feb. 22, 2017", 3 pgs.
"Korean Application Serial No. 2016-7000111, Final Office Action dated Apr. 17, 2017", (w English Translation), 7 pages.
"Australian Application Serial No. 2014274905, Response filed May 19, 2017", 18 pgs.
"U.S. Appl. No. 14/109,737, Final Office Action dated May 26, 2017", 19 pgs.
"European Application Serial No. 14807509.6, Response filed Jun. 13, 2017", 9 pgs.
"Australian Application Serial No. 2014274905, Subsequent Examiners Report dated Jun. 19, 2017", 3 pgs.
"U.S. Appl. No. 14/109,737 Examiner Interview Summary dated Jun. 20, 2017", 3 pgs.
"U.S. Appl. No. 14/109,737, Response filed Jul. 20, 2017 to Final Office Action dated May 26, 2017", 18 pgs.
"Korean Application Serial No. 2016-7000111, Request for Reexamination filed Jul. 17, 2017", W English Claims, 25 pgs.
"Korean Application Serial No. 2016-7000111, Final Office Action dated Jul. 25, 2017", w English Translation, 7 pages.
"Korean Application Serial No. 2016-7000111, Response filed Oct. 24, 2017 to Final Office Action dated Jul. 25, 2017", W English Claims, 17 pgs.
"Canadian Application Serial No. 2,913,994, Response filed May 30, 2017 to Office Action dated Nov. 30, 2016", 25 pgs.
"U.S. Appl. No. 14/109,737, Non Final Office Action dated Dec. 15, 2017", 18 pgs.
"Canadian Application Serial No. 2,913,994, Office Action dated Nov. 30, 2017", 4 pgs.
"European Application Serial No. 14 807 509.6, Communication Pursuant to Article 94(3) EPC dated Feb. 6, 2018", 7 pgs.
"U.S. Appl. No. 14/109,737, Examiner Interview Summary dated Mar. 27, 2018", 3 pgs.
"U.S. Appl. No. 14/109,737, Response filed Apr. 16, 2018 to Non Final Office Action dated Dec. 15, 2017", 18 pgs.
"Canadian Application Serial No. 2,913,994, Response filed May 2, 2018 to Office Action dated Nov. 30, 2017", 8 pages.
"European Application Serial No. 14 807 509.6, Response filed Jun. 7, 2018 to Communication Pursuant to Article 94(3) EPC dated Feb. 6, 2018", 15 pages.
"U.S. Appl. No. 61/831,607, "Store of the Future", filed Jun. 5, 2013", (Jun. 5, 2013), 43 pages.
"Notice of Non-Compliant Amendment received for U.S. Appl. No. 14/109,737 dated May 18, 2018", (May 18, 2018), 3 pages.
Shader, Danny, "PayNearMe at FinovateFall 2010", [Online]. Retrieved from the Internet: http: www.youtube.com watch?v=d-oaZpCzpqk, (Nov. 5, 2010), 18 pages.
Non-Compliant Amendment response filed on Sep. 17, 2018 for U.S. Appl. No. 14/109,737, dated May 18, 2018, 18 pages.
Office Action received for Canadian Patent Application No. 2,913,994, dated Oct. 23, 2018, 3 pages.
Office Action received for Chinese Patent Application No. 201480044276.8, dated Dec. 13, 2018, 24 pages (13 pages Official Copy and 11 pages English Translation).
Non-Final Office Action received for U.S. Appl. No. 15/802,352, dated Aug. 7, 2019, 8 pages.

\* cited by examiner

```
<video id="video1" width="500">
    <source src="movie.mp4" type="video/mp4">
    <source src="movie.ogg" type="video/ogg">
</video>

<script>
 var myVideo=document.getElementById("video1");
 var isPaused = myVideo.paused;
 // pause a video
 myVideo.pause();
    // change the width of the video
    myVideo.width=560;
    // play the video
    myVideo.play();
</script>
```

FIG. 13

```
_V_("jdm-legends").ready(function(){
    var myPlayer = this;

// going to different pages will pause the video
    $(".arrow-link").on("click",function(){
     myPlayer.pause();
    });

// Clicking on Images will play video where the image is pointing at
    $(".part-box .roll-over > section > span").on("click",function(){
    var videoTime = $(this).parents(".part-box").find("img").data().videoTime;
    myPlayer.play();
    setTimeout(function(){
     myPlayer.currentTime(videoTime);
    },100);
    });

// set a timer to read the video currentTime and change elements in the page
based on the time
        myPlayer.addEvent("play", function(){
        var intTimer = setInterval(function(){
         var curTime = parseInt(myPlayer.currentTime());
         var duration = myPlayer.duration();

$(".part-box
img[data-video-time]").parents(".part-box:has(.colorful-overlay)").each(function(){ if(parseInt($(this).find("img").data("videoTime")) <= curTime ){

$(this).find(".roll-over").addClass("transActive").end()
             .find(".colorful-overlay,.time-stamp")
             .fadeOut();

}else{
             $(this).find(".roll-over").removeClass("transActive").end()
             .find(".colorful-overlay,.time-stamp")
             .fadeIn();
            }
         });

if(parseInt(duration) <= curTime){
          clearInterval(intTimer);
         }
        },1000);
        });

SHOPPABLE VIDEO

RELATED APPLICATIONS

This application claims the priority benefit of U.S. Provisional Patent Application No. 61/800,702, filed on Mar. 15, 2013, and of U.S. Provisional Patent Application No. 61/906,869, filed on Nov. 20, 2013, which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The present application relates generally to the technical field of data processing and, in one specific example, to methods and systems for facilitating shopping for items shown or used in a video.

BACKGROUND

Traditionally, buyers have purchased products at brick-and-mortar stores and, more recently, online. A person who sees a product in a video may research the product using, for example, a search engine and may determine where he or she may purchase the product.

BRIEF DESCRIPTION OF THE DRAWINGS

Some embodiments are illustrated by way of example and not limitation in the figures of the accompanying drawings in which:

FIGS. 13-14 illustrate examples of software code used to implement the video controlling and shopping system, according to various example embodiments.

DETAILED DESCRIPTION

Figure 1:
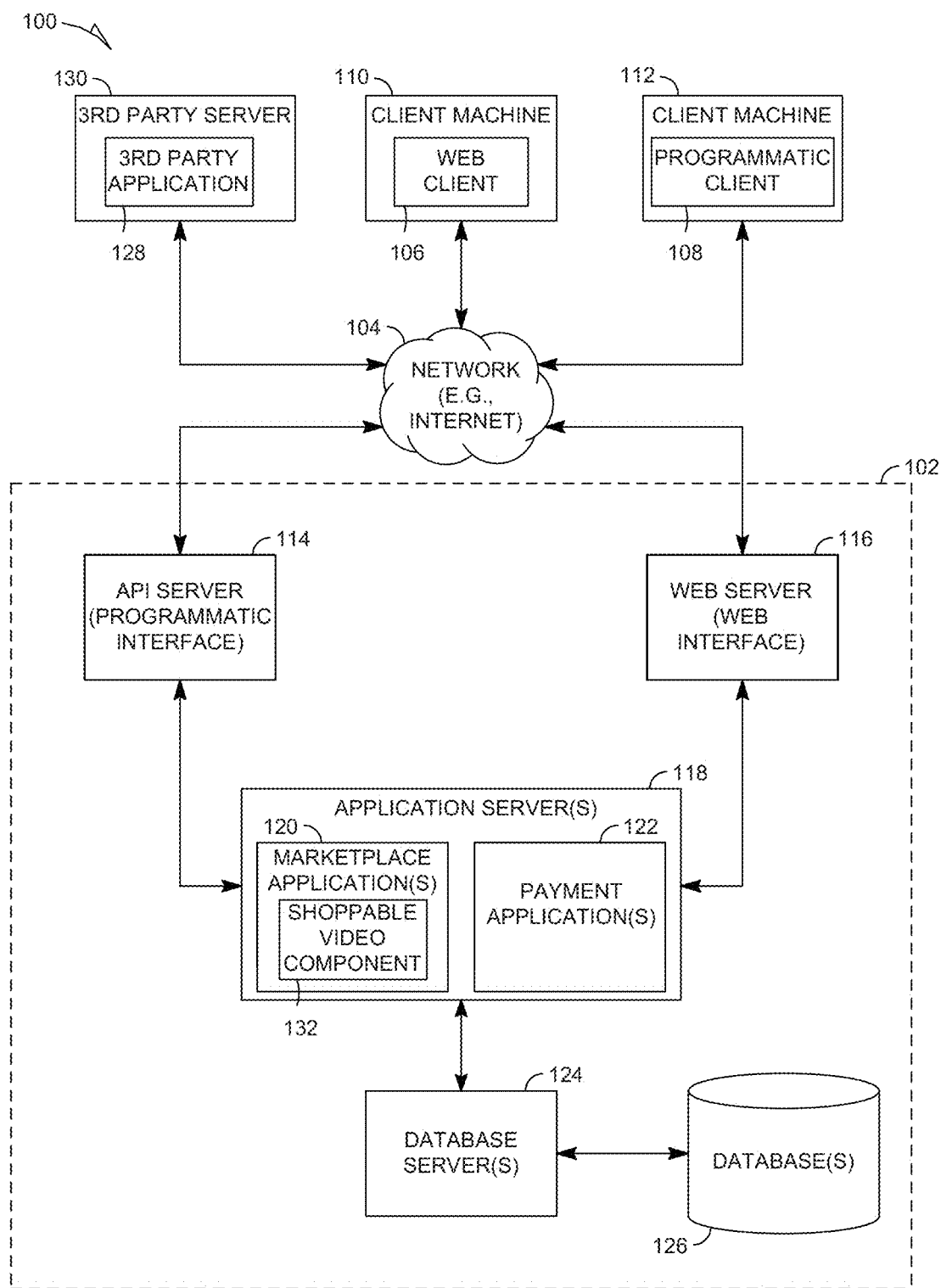
FIG. 1 is a network diagram depicting a client-server system, within which various example embodiments may be deployed.

Example methods and systems for connecting a video to additional relevant content via images related to the video and for controlling the video based on the images are described. Also, example methods and systems for connecting a video to listings of items for sale via images from the video and for controlling the video based on the images are described. In the following description, for purposes of explanation, numerous specific details are set forth in order to provide a thorough understanding of example embodiments. It will be evident, however, to one skilled in the art that the present invention may be practiced without these specific details.

In some example embodiments, the subject matter described herein may facilitate the control (e.g., by a user) of playback of a video based on the use of images copied from the video and displayed together with the video in a user interface (or "UI"). The video may include (e.g., show, display, illustrate, present, discuss, etc.) one or more content items, such as products, services, or places. The images may include representations (e.g., snapshots of the video, photographs, drawings, models, 3D representations, or any other representation) of products, services, places, etc. The images may be selectable (e.g., by a user). The ability to select a particular image may allow a user to request that a video controlling and shopping system plays back the video starting at a segment of the video that is relevant to the item represented in the image. Furthermore, a user's selection of a particular image may indicate the user's interest in the item represented in the image. The video controlling and shopping system may present additional information that is pertinent to the user's deduced interest in the item.

The subject matter described herein may facilitate, based on the use of images displayed together with the video, the accessing of additional information related to one or more items of content of the video (e.g., the accessing of a shopping site to purchase items shown, discussed, or used in the video). For example, a video that shows one or more consumer products is played in an area of the UI. One or more images displayed together with the video (e.g., in the same or a different area of the UI) may illustrate a representation of the one or more consumer products that appear in the video. The images may selectable by users. Based on a selection (e.g., by a user) of an image that illustrates a particular consumer product, the video may be played back from a particular time in the timeline of the video when the particular consumer product appears in the video, a listing of the particular consumer product may be presented to the user to facilitate a purchase of the particular consumer product, additional information pertinent to the consumer product (e.g., other buyers' feedback) may be displayed, or any suitable combination thereof may occur.

According to some example embodiments, each image displayed together with the video is related to one or more items of content of the video. Each image may be linked to (e.g., associated with, connected to, or related to) both a certain part of the video based on a time in the video timeline that at least a portion of a particular content item appears in the video and to a source of additional information relevant to the particular content item. A source of additional information may be a shopping site where items (e.g., products or services) that appear or are discussed in the video may be purchased, a blog, article, or forum discussing the item, a listing of items for sale, etc. The linking of the images to different parts of the video using time stamps may allow a user of the UI to selectively watch particular portions of the video based on select particular images. In addition, the linking of the images to additional sources of information may allow the user to learn more about the items of content of the video, purchase items that are represented in the video, or both.

By linking an image to both a video that displays or discusses an item and to an additional source of information about the item, the video controlling and shopping system may allow a user to have a new experience. Based on the images linked to the video, the user may both manipulate the video, obtain new information about the items that appear (or are discussed) in the video, or shop the items without performing any additional steps, such as stopping the video to search for items that appear interesting in the video.

In some example embodiments, the additional information may be presented to the user concurrently with the video playing. For example, the video controlling and shopping system may be playing a video in a video player area of the UI. The UI may also display several images linked to the video and to sources of additional information. The video controlling and shopping system may receive a selection of an image (e.g., from a user). In response to the received selection, the video controlling and shopping system plays back the video from the time stamp (in the video timeline) associated with the selected image. Simultaneously with playing back the video starting at the particular time stamp, the video controlling and shopping system presents additional information that corresponds to the selected image based on identifying the source of additional information associated with the selected image. In other example embodiments, based on the user selecting a particular sub-area of the image, the video controlling and shopping system either plays back the video or presents additional information related to the content of the image. In certain example embodiments, the playing back of the video and the presenting of the additional information is staggered in time according to a pre-determined rule.

In some example embodiments, the images may be linked to an online marketplace where the user may access descriptions of the items (e.g., products or services) shown in the video. In some instances, descriptions of similar or related items may be provided to the user. The online marketplace may further allow the user to purchase an instance of a product from one or more sellers.

The video controlling and shopping system and methods described herein may be used in different commerce areas, for example, in fashion, electronics, motors, product reviews, and tutorials. For example, a video may comprise an extended fashion show that includes displaying a series of shoes. Snapshots illustrating the shoes may be included in images that are displayed together with the video. A user, by selecting a particular image, may navigate to the portion of the video that displays the shoes shown in the selected image. The user may further be provided the option to purchase the shoes on an electronic marketplace. In some instances, a shoe store UI or website may be displayed to the user (e.g., in the UI that includes the video player and the images, or in a different UI or browser window). In some instances, one or more listings of shoes may be presented to the user (e.g., in the UI that includes the video player and the images, or in a different UI or browser window).

In certain example embodiments, a user may be presented a UI that includes a first area that displays a video and a second (e.g., adjacent) area that displays one or more still images (e.g., snapshots or frames) of the video corresponding to particular time stamps in the timeline of the video. Consistent with some example embodiments, the second area is external (not included) in the first area. Consistent with other example embodiments, a portion of or the entire second area is included in the first area. According to various example embodiments, a portion of or the entire second area is overlaid on the first area or vice versa. In some instances, the first area or the second area represents a semi-transparent overlay over the other area that may allow both the video and the still images to be viewed simultaneously. In some example embodiments, the image (e.g., displayed outside the video) is identical to at least a portion of the still image of the video at the corresponding time stamp.

The video controlling and shopping system may link an image both to the video based on the time stamp of the image and to a web address (e.g., URL). The web address may identify a website that includes a listing or description of the product (or service), a Search Results Page (SRP), a Retail Promo Platform (RPP) page, a store page, an individual seller's page, a how-to page, a blog page, a page that includes an article, etc. In some example embodiments, while the video is displayed or played, if a user selects (e.g., clicks on, hovers the mouse over, identifies using a voice command, etc.) a first portion of the image, the video controlling and shopping system interrupts the play-back of the video, skips to the time indicated by the time stamp of the image, and plays the video starting at the time stamp associated with the image. If the user selects a second image that has a second time stamp associated with it, the video controlling and shopping system may skip a portion of the video and play the video from the time that corresponds to the second time stamp. Thus, the user can control the video (e.g., the parts of the video played) by selecting a particular image of the one or more images displayed together with (e.g., adjacent to) the video player.

In some instances, when the user selects a second portion of the image, the video controlling and shopping system may stop the video and display a description of a product that is shown in the image (and in the video at the time corresponding to the time stamp of the image). In certain example embodiments, the product may not be shown in the video but may be used as part of a process discussed (described) in the video. For example, in a video tutorial about how to change the oil in a car, the actual product (e.g., engine oil) may not appear in the video but the narrator may discuss using it. In these instances, the still image captured from the video and positioned adjacent to the video may not include a depiction of the product. However, clicking on the still image that corresponds to the time when the engine oil is discussed in the video may cause a listing of engine oil products to be displayed. The listing may be displayed, for example, in a new window or a new browser tab. The listing may be displayed as one of a group of listings. In certain example embodiments, if the video does not depict a product at the time of the image time stamp but discusses the product, a representation of the product (e.g., a stock photograph or drawing) may be displayed adjacent to the video instead of the still image. The user is able to navigate to a description of a product from a still image that is itself linked to a particular point in time in the video.

In certain example embodiments, the video controlling and shopping system generates a UI that includes a video and still images representative of certain frames of the video. The still images depict, for example, products that appear (or are discussed) subsequent to those frames. A still image displayed together with the video may be used to both control the video and to link to a source of additional information (e.g., an electronic marketplace).

In some example embodiments, the generating of the UI is based on input from an entity. The entity may be, for instance, a computer program or a human being, such as a seller or an administrator (e.g., a marketplace administrator, a programmer, website designer, developer, a curator of content, or another third party). For example, the video controlling and shopping system may receive user input that includes a selection of a UI layout (e.g., a dynamic template), an identification (e.g., an identifier) of a video, an identification of a time stamp in a timeline of the video, and an identification of a web address of a web site that includes a listing of a product for sale. The UI layout may be a template that indicates the arrangement of the component parts of the UI. The administrator may select the layout of the UI from one or more layouts provided by the video controlling and shopping system. Alternately, the administrator may provide a layout, or modify a layout suggested by the video controlling and shopping system. The identification of the UI layout may be any description of the layout, such as a name, location, shape, composition, or number, or combination thereof. Similarly, the administrator may select a video suggested by the video controlling and shopping system or may provide a video, and may indicate an identification of the video as part of the user input.

To illustrate, based on one or more videos suggested by the video controlling and shopping system that discuss a product that a seller may list for sale on the electronic marketplace, the seller may select a video. In some instances, the seller may provide a video instead of selecting a video suggested by the video controlling and shopping system. The video controlling and shopping system may suggest one or more still images from the video that are representative of the product listed for sale. Based on the suggested images, the seller may drag and drop the images to position them around the video. The time stamps of the still images are used to connect the video to the still image. The seller provides a Uniform Resource Locator (hereinafter, also "URL" or "web address") for each image into a URL field to indicate the web page to which to link a user in response to the selection of the particular image.

In some example embodiments, instead of dragging and dropping images provided by the video controlling and shopping system, by identifying one or more time stamps, the entity (e.g., the administrator or the seller) indicates to the video controlling and shopping system the still images (or frames) in the video at which the video controlling and shopping system may capture images to be displayed in the UI adjacent to the video. Further, by indicating a web address to which the image may be linked, the administrator informs the video controlling and shopping system to what shopping site to connect the user when he or she selects the particular image.

In certain example embodiments, instead of dragging and dropping images provided by the video controlling and shopping system or instead of specifying which video snapshots to be automatically captured by the video controlling and shopping system, the entity (e.g., the administrator or the seller) provides content to be connected to (e.g., associated with) the video via specified (e.g., user-specified) time stamps and to be displayed together with the video (e.g., adjacent to the video or overlaid on an area of the video). The content provided by the entity may be a representation of an item (e.g., a photo of the item, a stock photograph, an image of the item, a model, a 3D representation, etc.), a title, a price, etc.

Then, the video controlling and shopping system may generate, based on the input from the user, an image that includes a captured still image of the video that corresponds to the point in time of the video identified by the time stamp. As discussed above, the image may be at least a portion of a still image of the video based on the pre-defined time stamp. In other instances, the image may comprise a representation of the product, such as a stock photograph or drawing of the product. Further, the video controlling and shopping system may generate a first link between a first portion of the image and a time in the video timeline that corresponds to the time stamp and a second link between a second portion of the image and the web address. The first and second portion may or may not at least partially overlap. Finally, the video controlling and shopping system may generate a UI that includes the video and the images based on the UI layout.

When a user selects to view the UI, in some example embodiments, the video controlling and shopping system displays a video and one or more images that each show a snap shot of the video corresponding to a video time stamp. Each image may include a representation of an item that appears or is discussed in the video (e.g., a product or a service). In some instances, the user may select an image of the one or more images when no video is being played. Upon receiving a selection of a first portion of the image (e.g., from the user), the video controlling and shopping system interrupts the displaying of the video and re-displays the video starting at a time that corresponds to the time stamp. Before the video controlling and shopping system re-displays the video, the video controlling and shopping system "jumps" or "skips" over a portion of the video. As such, the user does not view the "skipped" video content but is shown the part of the video starting with the time that corresponds to the time stamp of the image selected by the user. Upon receiving a selection of a second portion of the image, the video controlling and shopping system, in some instances, interrupts the displaying of the video and displays a listing (of the product) that includes an identification of the product and an indication that the product is for sale on an electronic marketplace. In other example embodiments, the video controlling and shopping system does not interrupt the displaying of the video while it displays the listing.

In some example embodiments, instead of a user selecting a particular image to view additional information about the item shown in the video, the image, or both, the video controlling and shopping system automatically displays the additional information. The additional information may be presented in the same or in a further UI. The additional information may be displayed simultaneously with the item appearing in the video. In some instances, the additional information includes a description (e.g., a listing) of a product (or service) for sale.

According to certain example embodiments, the video (e.g., a movie) is a primary image in a UI. Various ads or secondary images that pertain to items that appear or are discussed in the video may be displayed around the primary image (e.g., the video). These ads and images may be presented as the items appear or are discussed in the video. For example, an actor in the video displayed as the primary image of the UI is wearing a leather jacket in a particular scene. As the jacket is shown in the video, the jacket is advertised in a first ad displayed together with the video in the UI. When the scene changes to a car chase, the car may be advertised in a second ad displayed together with the video. In some instances, the first and second ads may change automatically (e.g., the ads may be played sequentially in the same UI window), while the video remains the primary image. In other instances, the first and second ads are displayed in separate UI windows and are accessible for replay (e.g., by a viewer) at any time after they are first played concurrently with a corresponding scene in the video.

In some embodiments, while the video is shown in the video player, the video controlling and shopping system may change the look of the images in the UI. For example, as the playback of the video passes the time stamp of a particular image, the video controlling and shopping system may modify the display of the image by, for example, changing the colors included in the image, changing the size of the image, or changing some other aspect of the image. When the video controlling and shopping system finishes displaying the video, all the images may be modified in the same way. In some instances, the video controlling and shopping system may highlight a first image until the video playback passes the time stamp of a second image. Then the second image is highlighted.

In certain example embodiments, the user's interaction with the UI comprising the video and the image(s) may be tracked to determine what the user finds interesting in the UI (e.g., content or context of the UI). For example, by capturing where in the UI the user spends time while viewing the video or the image(s), or both, the video controlling and shopping system may gather data about the user's likes or dislikes. In some instances, the video controlling and shopping system may determine which part of the UI contains information that interests the user by tracking pointer events (e.g., of the user's computer mouse) in any part of the UI (e.g., the video display or the image(s)). Alternately or additionally, the video controlling and shopping system may use other methods of tracking user interest in a UI, such as using biometric data.

A potential buyer watching the video may be interested in things such as where the video was taken (e.g., beautiful location, interesting museum, or cool architecture), whose music plays in the background, what makeup brand was used on the models in a fashion show, etc. In some example embodiments, the video controlling and shopping system may facilitate the sale of more than just the products that appear in the snapshots. Services, advertising, and brand placement are some examples of things that may be promoted using the subject matter described herein.

Furthermore, in certain example embodiments, the video controlling and shopping system allows the user to ask questions in relation to content that is displayed in the video but may not appear in the images (e.g., "Where can I buy item X that appears in the video but not in the snapshots?"; "Where is the video shot?"; and "Who shot this video?"). The video controlling and shopping system may provide answers and suggest places to buy item X, travel arrangements to visit the place where the video was shot, or recommend the person who directed or shot the video.

By allowing the user to communicate what he is interested in (not just by tracking which image he clicked on, but by creating ways a user can communicate to the video controlling and shopping system), the video controlling and shopping system may gather additional data about the user's interests. In response to the user providing input (e.g., text, voice, clicking, or other behavior) tied to certain points in time in the video and communicating an intent to purchase a product or asking a question, the video controlling and shopping system may determine whether the user's interest is about the video, in general, or about a particular part of the video. If the user interest is about a portion of the video, the video controlling and shopping system may determine a time stamp that points to an area of user interest in the video based on the user input, may retrieve data that describes that portion of the video that corresponds to the time stamp, may examine additional data available for the user (e.g., to match the content of the particular portion of the video with any attributes of the user and determine the relevance of the content to the user), and may provide additional content to the user (e.g., an answer to the user's question, a link to a page, etc.)

In some example embodiments, a magazine may be depicted at a point in time identified by a time stamp in the video. A snapshot depicting the magazine may be included in an image displayed adjacent to the video. When the user selects the snapshot of the magazine, the video is played back to the user beginning at the point in the video identified by the time stamp. Further, the user may be provided the option to purchase or subscribe to the magazine (e.g., purchase and read an online version of the magazine).

FIG. 1 is a network diagram depicting a client-server system 100, within which various example embodiments may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. In various example embodiments, the marketplace applications 120 may include a shoppable video component 132. The shoppable video component 132, in some example embodiments, may allow users to control playback of a video that depicts or discusses one or more items (e.g., products or services) and to purchase the items shown or used in the video using an online marketplace. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. In various example embodiments, the seller application may allow users to negotiate a bundle of items provided by the users and to create a bundle listing (e.g., to be published using an online marketplace catalogue).

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
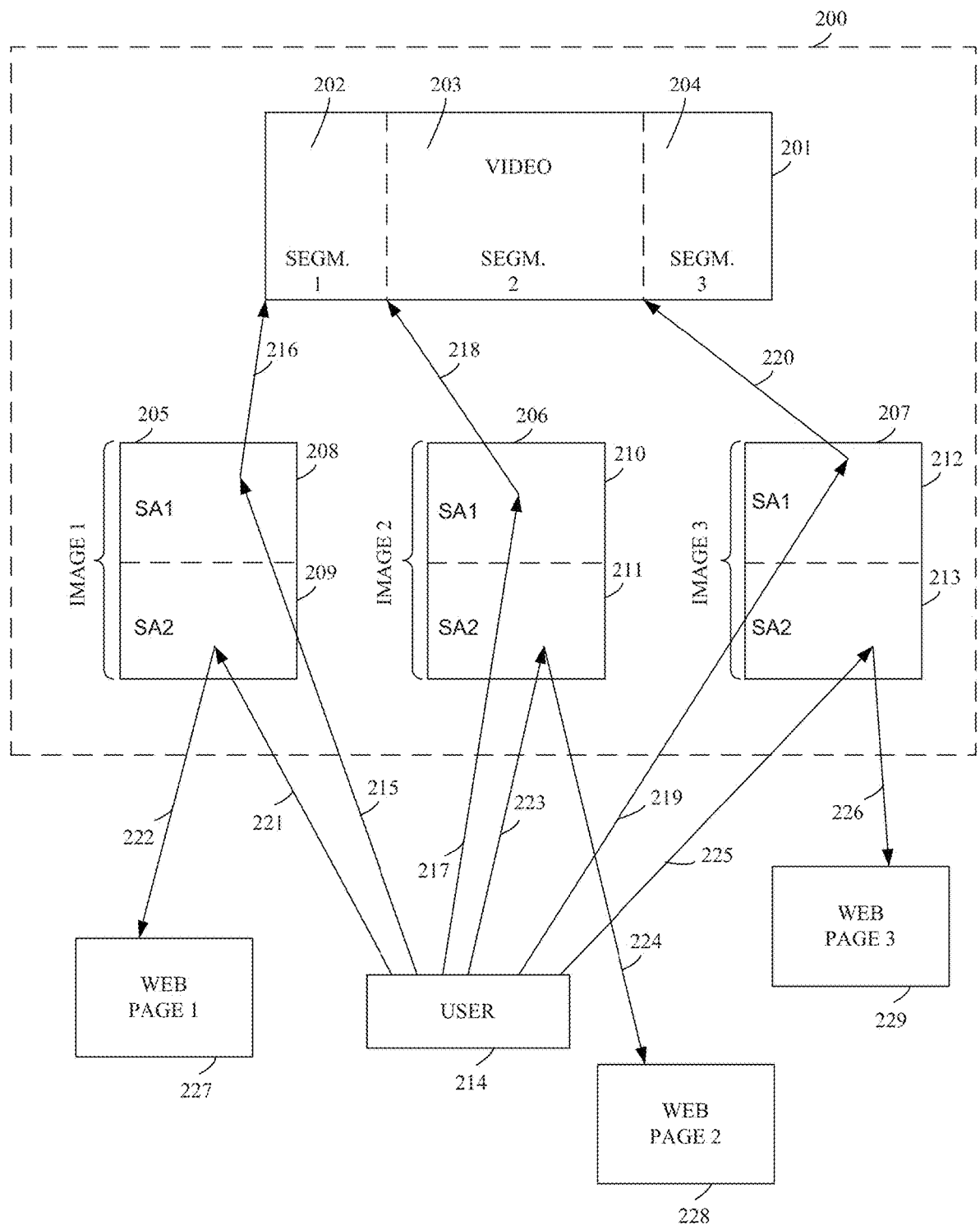
FIG. 2 is a functional representation of an example video controlling and shopping system, according to various example embodiments.

FIG. 2 is a functional representation of an example video controlling and shopping system, according to various example embodiments. In some example embodiments, a user 214 interacts with a UI 200 that is displayed on a client device of the user 214. The UI 200 may include a first area that displays a video 201 and a second area that displays one or more images (e.g., image 205, image 206, or image 207). Each of the image 205, the image 206, or the image 207 may be divided (e.g., logically or visually) into a plurality of sub-areas. For example, the image 205 may be divided into a first sub-area 208 and a second sub-area 209, the image 206 may be divided into a first sub-area 210 and a second sub-area 211, and the image 207 may be divided into a first sub-area 212 and a second sub-area 213. The division of the image 205, the image 206, or the image 207 may or may not be visible to the user. For example, to indicate to the user that an image is divided into two horizontal sub-areas, the image may include a horizontal line that separates a top sub-area of the image from a bottom sub-area of the image. Furthermore, the video controlling and shopping system may provide additional information to the user to communicate a reason for the division of the image. For example, the sub-area 208 of the image 205 may include text overlaid on a portion of the image to communicate to the user 214 an action the user 214 may take (e.g., "Jump to this part of the video". The sub-area 209 of the image 205 may include a different message for the user 214 (e.g., "Shop Now").

In some example embodiments, the video 201 may include a plurality of video frames. One or more video frames may be grouped into one or more segments. For example, as illustrated in FIG. 2, the video 201 includes a first segment 202, a second segment 203, and a third segment 204. The video 201 may include more or less segments. Each of the segments 202, 203, and 204 lasts a particular period of time of the timeline (or the duration) of the video 201. Each period of time is associated with a particular segment of the video. The period of time may or may not be equal to each other. Each of the segments 202, 203, and 204 has a particular starting time stamp (e.g., a point in time in the timeline of the video) that indicates the beginning of the segment 202, segment 203, or segment 204. Each of the images 205, 206, and 207 may be associated with (e.g., connected to, matched to, related to, etc.) a particular time stamp that indicates the beginning of a particular segment of the video, such that the content of the image corresponds to the content of the video 201 at the particular time stamp in the video timeline of the video 201.

In some example embodiments, a sub-area of an image may be associated with (e.g., connected to, matched to, related to, etc.) a particular functionality of the video controlling and shopping system. For example, the sub-areas 208, 210, and 212 may be associated with a command to stop the video 201 and play back the video 201 starting at the time stamp associated with the respective sub-area 208, 210, or 212. To illustrate, the user 214 may select (e.g., click on) 215 the sub-area 208 of the image 205 via a client device associated with the user 214. The video controlling and shopping system may listen for user events, and may identify the selecting 215 as a user event pertaining to the client device associated with the user 214. In response to the identifying the selecting 215 as a user event, the video controlling and shopping system may access data that pertains to the selecting 215 and may determine that the user 214 selected the sub-area 208. Based on determining that the user 214 selected the sub-area 208, the video controlling and shopping system may determine that the sub-area 208 is included in the image 305, and may identify the time-stamp associated with the image 305. If the video 301 is playing at the time the user 314 selects 315 the image 305, the video controlling and shopping system pauses the video 301 and re-plays 316 the video 301 starting at the time indicated by the time stamp associated with the image 305. If the video 301 is not playing at the time the user 314 selects 315 the image 305, the video controlling and shopping system may play 316 the video 301 starting at the time indicated by the time stamp associated with the image 305.

As described above, in some example embodiments, a sub-area of an image may be associated with (e.g., connected to, matched to, related to, etc.) a particular functionality of the video controlling and shopping system. For example, the sub-areas 209, 211, and 213 may be associated with a command to display additional content related to one or more items of content of a particular image and/or related to one or more items of content of a corresponding segment of the video. To illustrate, the image 205 may include a snapshot of the video 201 captured at a particular time in the timeline of the video, the particular time being included within a particular segment of the video. The particular time may or may not be the same as a particular time stamp of the video. In some instances, the video 201 includes content related to one or more items (e.g., products or services) and each of the images 205, 206, and 207 includes a snapshot taken during the segment 202, segment 203, or segment 204, respectively. The snapshot included in one of the images 205, 206, or 207 may depict the item that appears or is discussed in the video during the respective segment. Alternatively or additionally, additional content (e.g., a title, a price, etc.) may be displayed in (or together with) the image 205, 206, or 207.

The user 214 may select (e.g., click on) 221 the sub-area 209 of the image 205 via a client device associated with the user 214. The video controlling and shopping system may listen for user events, and may identify the selecting 221 as a user event pertaining to the client device associated with the user 214. In response to the identifying the selecting 221 as a user event, the video controlling and shopping system may access data that pertains to the selecting 221 and may determine that the user 214 selected the sub-area 09. Based on determining that the user 214 selected the sub-area 209, the video controlling and shopping system may determine that the sub-area 209 is included in the image 205, and may identify the additional content (e.g., a listing or description of the item, a Search Results Page (SRP), a Retail Promo Platform (RPP) page, a store page, an individual seller's page, a how-to page, a blog page, a page that includes an article, etc.) associated with the image 205. The video controlling and shopping system may display the additional content in a web page 227 or in a further user interface.

Figure 3:
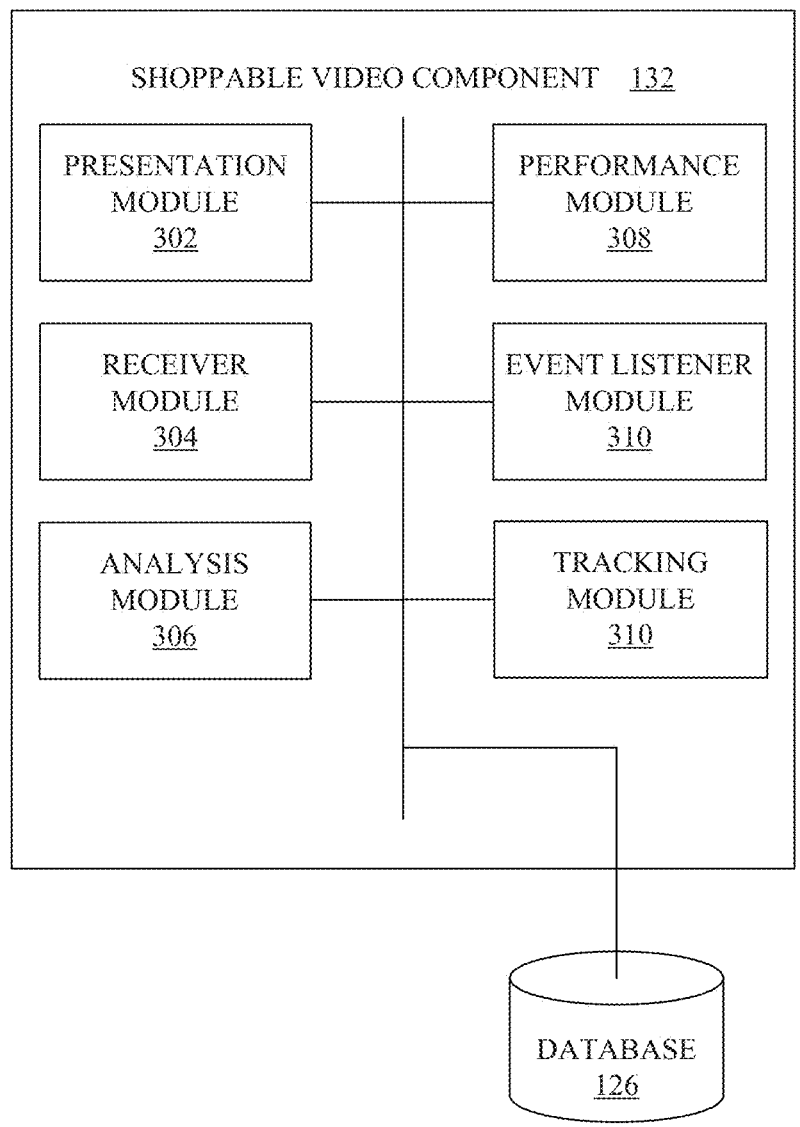
FIG. 3 is a block diagram of certain modules of an example shoppable video component, consistent with some example embodiments.

FIG. 3 is a block diagram of certain modules of an example shoppable video component, consistent with some example embodiments. The shoppable video component 132 is shown to include a number of modules that may be in communication with each other. One or more modules of the shoppable video component 132 may reside on a server, client, or other processing device. One or more modules of the shoppable video component 132 may be implemented or executed using one or more hardware processors. In some example embodiments, one or more of the depicted modules are implemented on a server of the network-based system 102. In FIG. 3, the shoppable video component 132 is shown as including a presentation module 302, a receiver module 304, an analysis module 306, a performance module 308, an event listener module 310, and a tracking module 310 configured to communicate with each other (e.g., via a bus, shared memory, or a switch). Also shown in FIG. 3 is a database 126 configured to communicate with one or more modules of the shoppable video component 132.

According to some example embodiments, the presentation module 302 is configured to present (e.g., to the user 214 via a client device associated with the user 214) a user interface that includes a video and one or more images. Each of the one or more images may be related to the content of the video (e.g., a particular product or service appearing or discussed in the video), and each of the one or more images may include a plurality of selectable sub-areas. In some example embodiments, the image includes a captured still (or still image) of the video that corresponds to a point in time (e.g., a time stamp) in the video timeline. The image may include a depiction of an item appearing in the video.

The receiver module 304 is configured to receive a selection of a sub-area of the plurality of sub-areas of an image of the one or more images (e.g., from the client device associated with the user 214). The selection may be performed by a user. The selection of the sub-area may indicate a request to perform an action that pertains to the content of the video. In some instances, the selection of the sub-area may indicate a request to control a playback of the video. In other instances, the selection of the sub-area indicates a request to obtain additional information.

The analysis module 306 is configured to identify the action based on the selection of the sub-area. The performance module 308 is configured to perform the action in response to the selection of the sub-area.

In some example embodiments, each of the one or more images is associated with a corresponding time stamp of a timeline of the video. The analysis module 306 is further configured to determine that the selection of the sub-area indicates a request to control a playback of the video, and to identify, based on the selection and on the determining, the time stamp associated with the image. The performance module 308 is further configured to, in response to the selection of the sub-area, play the video starting at the time stamp.

In certain example embodiments, each of the one or more images is associated with a location of a source of additional information that is relevant to the content of the video. The analysis module 306 is further configured to determine that the selection of the sub-area indicates a request to obtain the additional information, and to identify, based on the selection and on the determining, the location of the source of additional information. The performance module 308 is further configured to, in response to the selection of the sub-area, display the additional information.

In some example embodiments, the content includes an item appearing in the video, and the additional information displayed is pertinent to the item. The item may include a product, and the additional information may include a listing of an instance of the product for sale on an electronic marketplace. In some example embodiments, the additional information includes a web site of a seller who sells the item. In some example embodiments, the additional information includes a blog, a how-to-page, an article, etc.

The displaying of the additional information occurs, in certain example embodiments, concurrently with the item appearing in the video. According to various example embodiments, the additional information includes a description of the item, and the performing of the action includes facilitating a purchasing transaction (e.g., by the user 214) that pertains to the item.

In various example embodiments, each of the one or more images is associated with a corresponding time stamp of a timeline of the video and with a location of a source of additional information that is relevant to the content of the video. The analysis module 306 is further configured to determine that the selection of the sub-area indicates a request to control a playback of the video, and to identify, based on the selection and on the determining that the selection of the sub-area indicates a request to control a playback of the video, the time stamp associated with the image. The performance module 308 is further configured to, in response to the selection of the sub-area, play the video starting at the time stamp. The receiver module 304 is further configured to receive a further selection of a further sub-area of the plurality of sub-areas of the image. The analysis module 306 is further configured to determine that the further selection of the further sub-area indicates a request to obtain the additional information, and to identify, based on the further selection and on the determining that the further selection of the further sub-area indicates a request to obtain the additional information, the location of the source of additional information. The performance module 308 is further configured to display the additional information. In certain example embodiments, the additional information is displayed automatically (rather than in response to a selection of an image by a user) during the playback of the video, as a particular time stamp in the video timeline is passed.

The event listener module 310 is configured to detect an event that pertains to the image, the event being associated with a client device. In some example embodiments, the performance module 308 is further configured to, in response to the detecting of the event, alter the image to indicate one or more of the plurality of selectable sub-areas of the image.

In certain example embodiments, the event listener module 310 of the video controlling and shopping system receives an indication of a user event (e.g., a mouseover action, a click, a voice command, etc.) that pertains to the image. The indication of the user event may be received from a client device associated with the user 214. In response to the indication of the user event, the performance module 308 alters the image to indicate one or more of a plurality of sub-areas of the image. One or more sub-areas may be selectable by the user. The receiver module 304 may receive a selection of a first sub-area (e.g., a first button) of the plurality of sub-areas of a particular image from the client device. The selection may be made by the user 214. In response to the selection of the first sub-area, the performance module 308 may play the video starting at the time stamp associated with the particular image. Alternatively, the receiver module 304 may receive a selection of a second sub-area (e.g., a second button) of the plurality of sub-areas of the particular image from the client device. The selection may be made by the user 214. In response to the selection of the second sub-area, the analysis module 306 identifies a web address of a web site that includes additional content related to the content of the video at the time stamp and displays the web site, for example in a browser on the client device, based on the identified web address.

In some example embodiments, one or more modules of the video controlling and shopping system may identify, based on the content of the video, additional information pertinent to the content of the video, and may automatically display the additional information in the user interface. Alternatively or additionally, one or more modules of the video controlling and shopping system may identify additional content related to the content of the video, may generate a further user interface (to be displayed at the client device), and may present (e.g., display) the additional content in the further user interface. The images displayed together with the video may be linked to any web site (e.g., may connect to anywhere). By selecting an image adjacent to the video, a user may be redirected to a Search Results Page (SRP), a page dedicated to a specific product or service, a seller's page, a store page, a Retail Promo Platform (RPP) page, a how-to page, a blog, an article, etc. where additional content may be displayed. In some example embodiments, additional content from a Search Results Page (SRP), a page dedicated to a specific product or service, a seller's page, a store page, a Retail Promo Platform (RPP) page, a how-to page, a blog, an article, etc. may be displayed in an area of the shoppable video UI.

In some example embodiments, instead of snapshots of the video that correspond to particular time stamps, the areas adjacent to the video may display a photograph, a model, a 3D representation of an actual item shown or discussed in the video, a stock photograph of the item or service shown or discussed in the video, a title of the item or service, a price of the item or service, etc. Each of the areas adjacent to the video may be associated with a particular time stamp that corresponds to a point in the timeline of the video. Also, each of the areas adjacent to the video may be associated with a web address that corresponds to a web site that provides additional content related to the content (e.g., item or service) shown or discussed in the video at the particular time stamp.

According to some example embodiments, the selection is received from a client device associated with a user. The tracking module 310 is configured to track an interaction by the user with one or more components of the user interface. The analysis module 306 is further configured to determine, based on the interaction, that the user has an affinity for an item appearing in the video. For example, as described above, the video controlling and shopping system (e.g., the tracking module 310) may determine which part of the UI contains information that interests the user by tracking user events or pointer events (e.g., of the user's computer mouse) in any part of the UI (e.g., the video display or the image(s)). Alternately or additionally, the video controlling and shopping system may use other methods of tracking user interest in a UI, such as using biometric data. The performance module 308 is further configured to facilitate a communication with the user to provide additional information that is relevant to the affinity of the user for the item.

In some example embodiments, the corresponding time stamp associated with an image indicates a beginning of a particular segment of the video. A segment of the video may include one or more consecutive frames of the video. The playing of the video starting at the time stamp may, in some instances, include identifying, based on the time stamp, the particular segment of the video that corresponds to the time stamp, and playing the particular segment of the video.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 4:
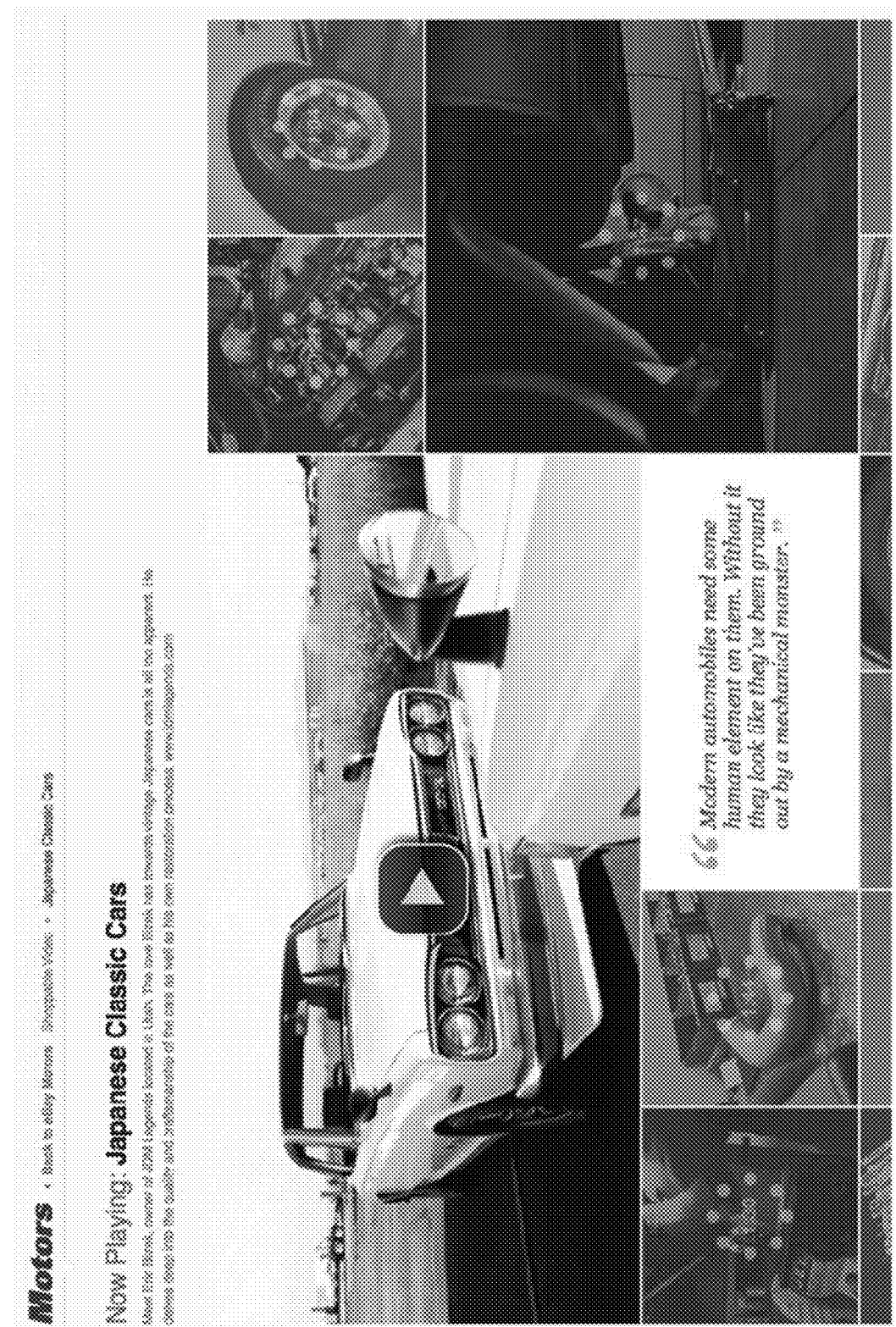
FIGS. 4-8 illustrate example portions of user interfaces for a method for facilitating the shopping of items appearing or discussed in a video, according to various example embodiments.

FIG. 4 illustrates an example portion of a user interface for a method for facilitating the shopping of items appearing or discussed in a video, according to various example embodiments. In certain example embodiments, as illustrated in FIG. 4, the UI includes a description of a video ("Japanese Classic Cars") and a video player in the top left corner including a "play" button in the center. The UI further includes a number of still images of the video positioned below and to the right of the video player. Each image may include a circle of dots that surrounds an indication of a time stamp of the image. Each image may be assigned a tint. The tinting of one or more images may indicate that the playback of the video has not yet passed any of the time stamps associated with the one or more images.

Figure 5:
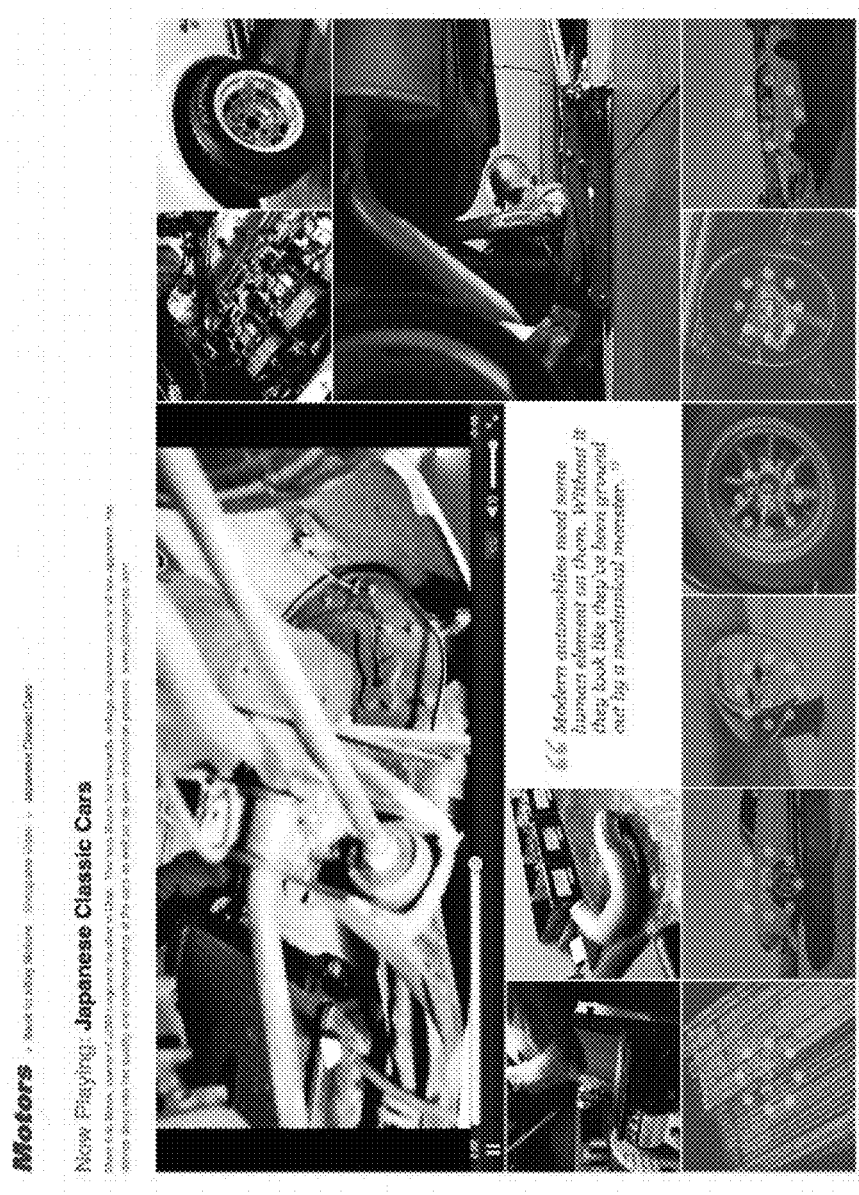

FIG. 5 illustrates an example portion of a user interface for a method for facilitating the shopping of items appearing or discussed in a video, according to various example embodiments. Upon the user selecting the "play" button, the video controlling and shopping system plays the video, as shown in FIG. 5. In certain example embodiments, the images may not display circles of dots indicating the time stamp of each still image. The tints in this image and the removal of the time stamp indicate that the playback of the video has passed a number of the time stamps. While the time stamps are not shown for some images, the user may still navigate (e.g., rewind) the playback of the video by selecting an image.

Figure 6:
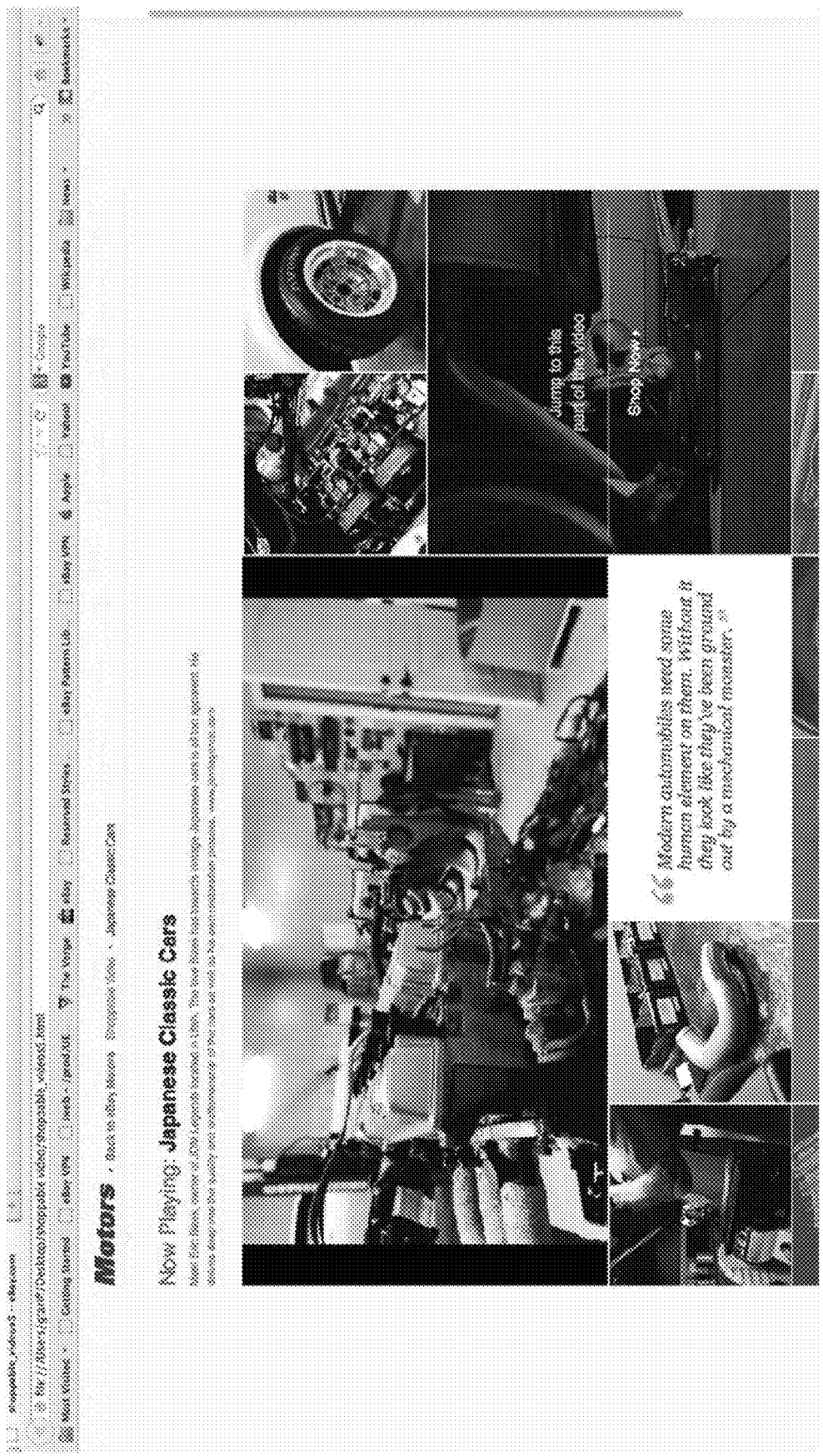

FIG. 6 illustrates an example portion of a user interface for a method for facilitating the shopping of items appearing or discussed in a video, according to various example embodiments. In some example embodiments, the images adjacent to the video may include a first portion (e.g., a first sub-area) of the image that is linked to the portion of the video that corresponds to the time stamp of the image. For example, the UI illustrated in FIG. 6 shows that the bottom right image includes a top portion of the image that comprises the text "Jump to this part of the video". When the user selects the top portion of the respective image, the video controlling and shopping system plays the video from the point in time that corresponds to the time stamp of the selected image. The image may further include a different portion (e.g., a second sub-area) of the image that is linked to a source of additional information (e.g., an electronic marketplace). The source of additional information (e.g., the electronic marketplace) may provide a listing of a product (depicted or discussed in the video at the respective time stamp) for sale. For example, as illustrated in FIG. 6, the bottom right image includes a bottom portion of the image that comprises the text "Shop now". When the user selects the bottom portion of the image, the video controlling and shopping system may display a description of a product that is shown in the image or discussed in the video at the point in time corresponding to the time stamp of the image. The description may include a listing of the product for sale to facilitate the purchase of the product.

Figure 7:
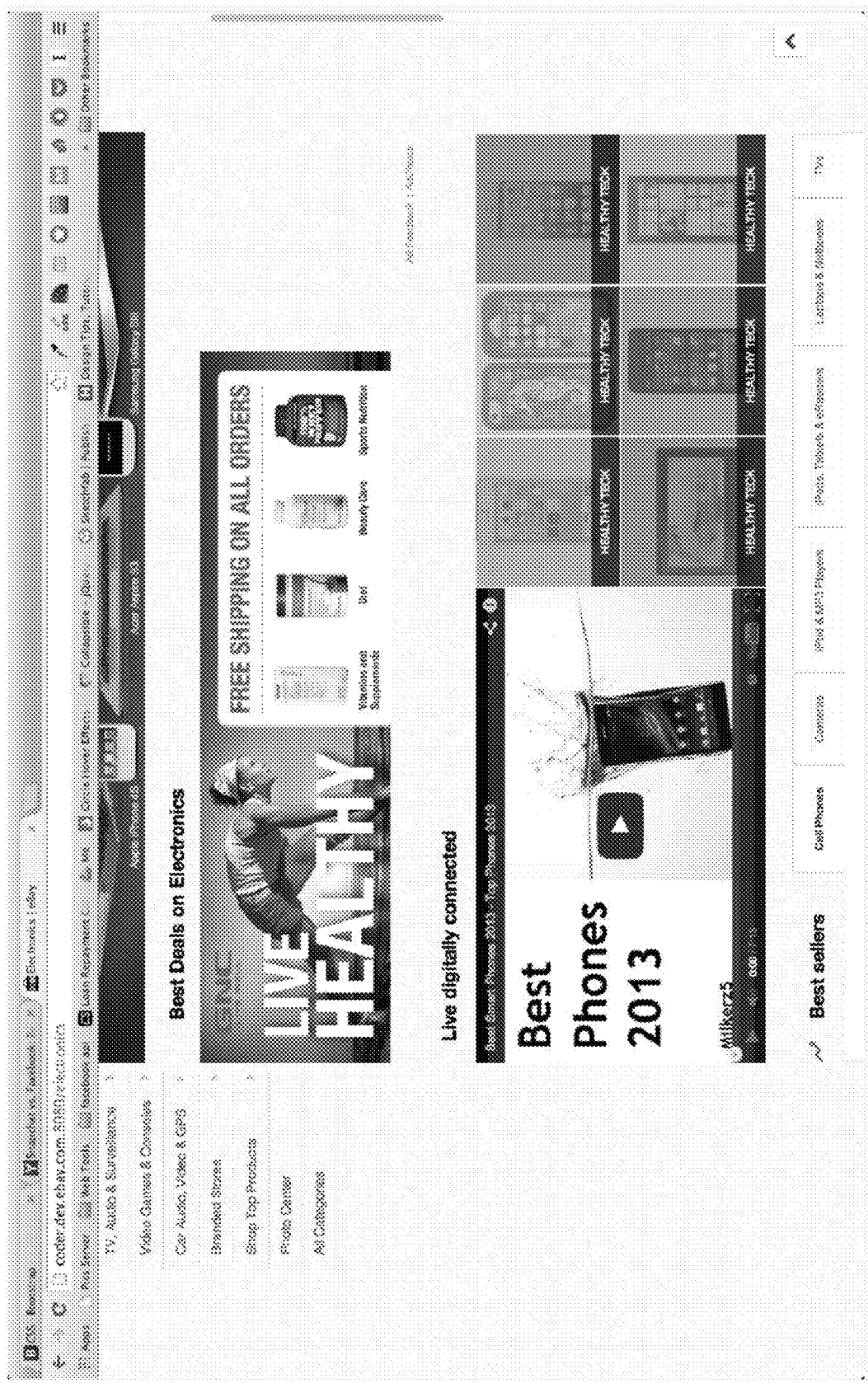

FIG. 7 illustrates an example portion of a user interface for a method for facilitating the shopping of items appearing or discussed in a video, according to various example embodiments. In some example embodiments, as shown in FIG. 6, the shoppable video UI is displayed to a user in a standalone web page. In certain example embodiments, the shoppable video UI is presented to a user as part of a web site that includes other content. For example, as depicted in FIG. 7, the shoppable video UI is included in the Electronics page of a marketplace under the rubric of "Live digitally connected".

Figure 8:
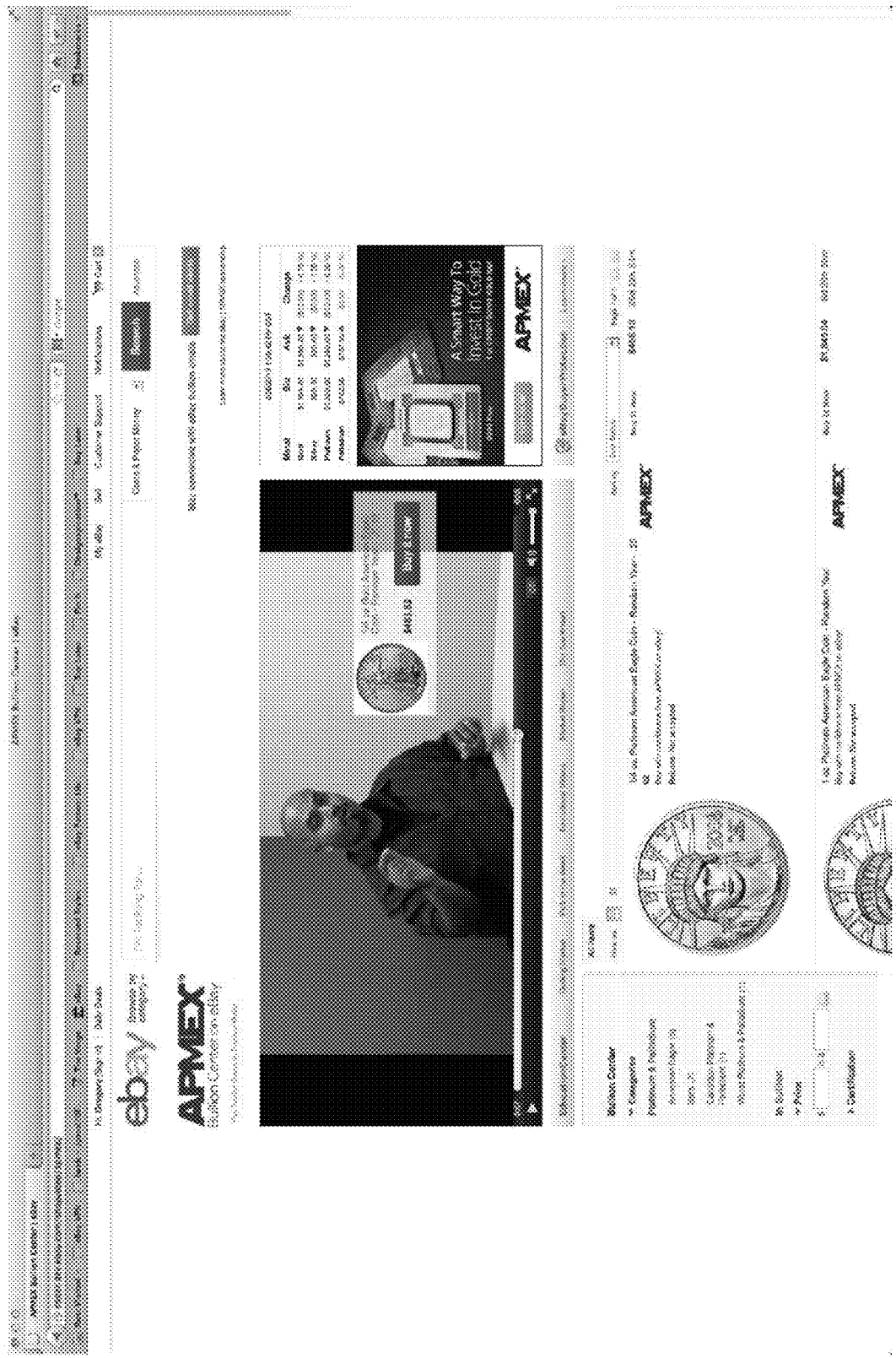

FIG. 8 illustrates an example portion of a user interface for a method for facilitating the shopping of items appearing or discussed in a video, according to various example embodiments. In certain example embodiments, an image of an item shown or discussed in the video is overlaid over a portion of a UI area that includes the video. One or more images may or may not be displayed adjacent to the video. Additionally or alternatively, one or more images of items shown or discussed in the video may be displayed as a list of items together with the video. The UI that includes the video and one or more images may be displayed to a user in a standalone web page or may be included in a web page that has additional content.

For example, as illustrated in FIG. 8, a UI including a video presenting American Eagle Coins and images of a ¼ oz. Gold American Eagle Coin, a ¼ oz. Platinum American Eagle Coin, and a 1 oz. Platinum American Eagle Coin is displayed in a web page (e.g., APMEX® Bullion Center on eBay) that includes other content related to the topic of the video and to items shown in the images. In some instances, as illustrated in FIG. 8, the web page may include a search area, a "Get email alerts" area, an Education Center area, a Bullion Center area, a metal price area, an advertising area, and an eBay Buyer Protection information area. The web page may present more or less additional content displayed together with the UI that includes the video and the images connected to the video.

Figure 9:
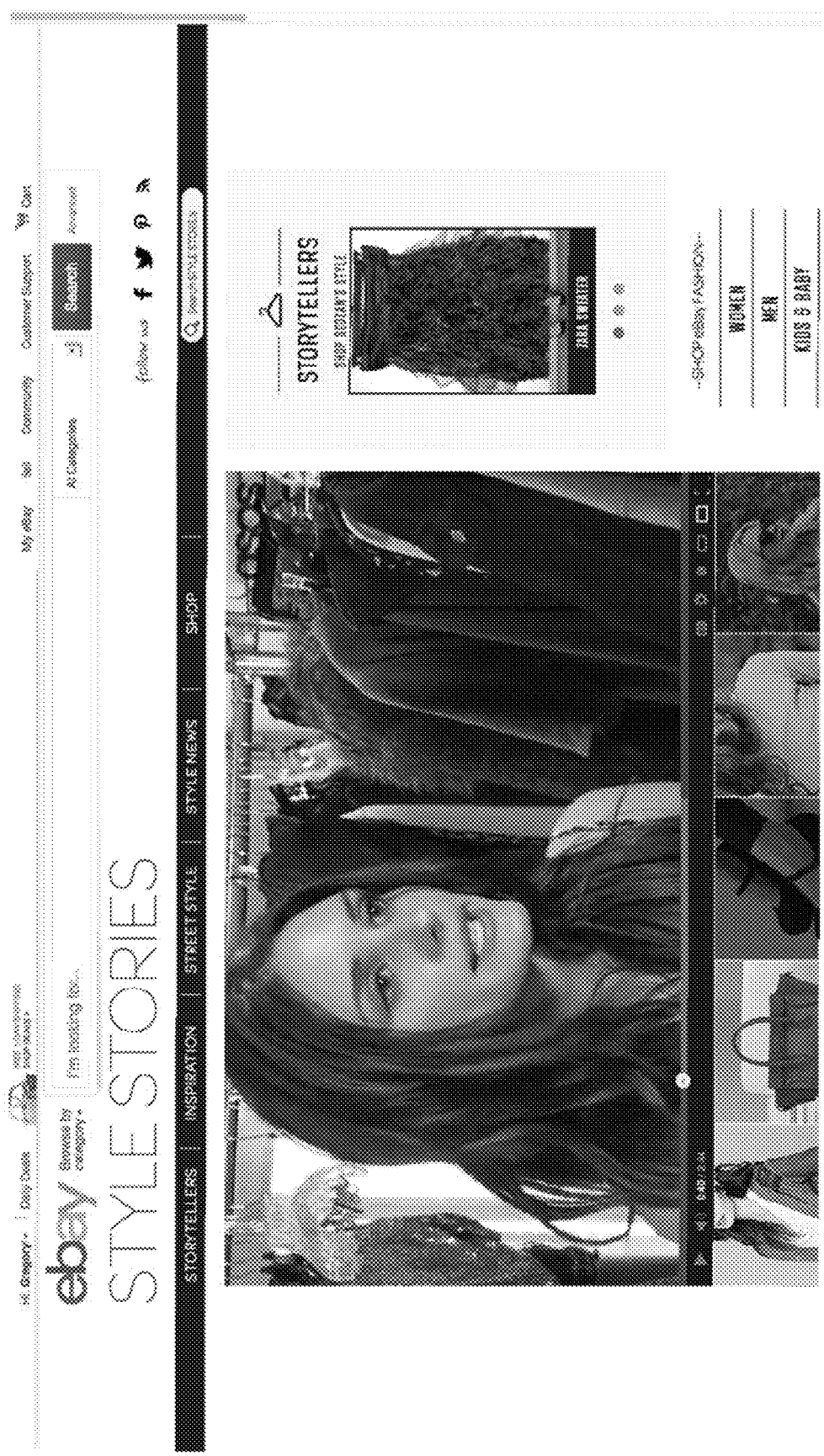
FIGS. 9-12 illustrate example portions of user interfaces for a method for facilitating the obtaining of additional information relevant to items appearing or discussed in a video, and the shopping of the items, according to various example embodiments.

FIG. 9 illustrates an example portion of a user interface for a method for facilitating the obtaining of additional information relevant to items appearing or discussed in a video, and the shopping of the items, according to various example embodiments. The illustration of FIG. 9 depicts one possible example layout of the user interface. In this example, the video occupies a larger portion of the user interface. The images including snapshots of the video captured at particular times in the timeline of the video are positioned below the video player. The images include depictions of products that are available for purchase on the electronic marketplace (e.g., a jacket, a purse, shoes, sweater, and sunglasses). As the playback of the video passes the time stamp of a particular image, the video controlling and shopping system modifies the display of the image (e.g., by changing the colors included in the image or by applying a digital filter to the image). By selecting a particular image, the user may navigate to the portion of the video that displays the product depicted in the selected image. The user may further be provided the option to purchase the product on the electronic marketplace or on a different web site.

Figure 10:
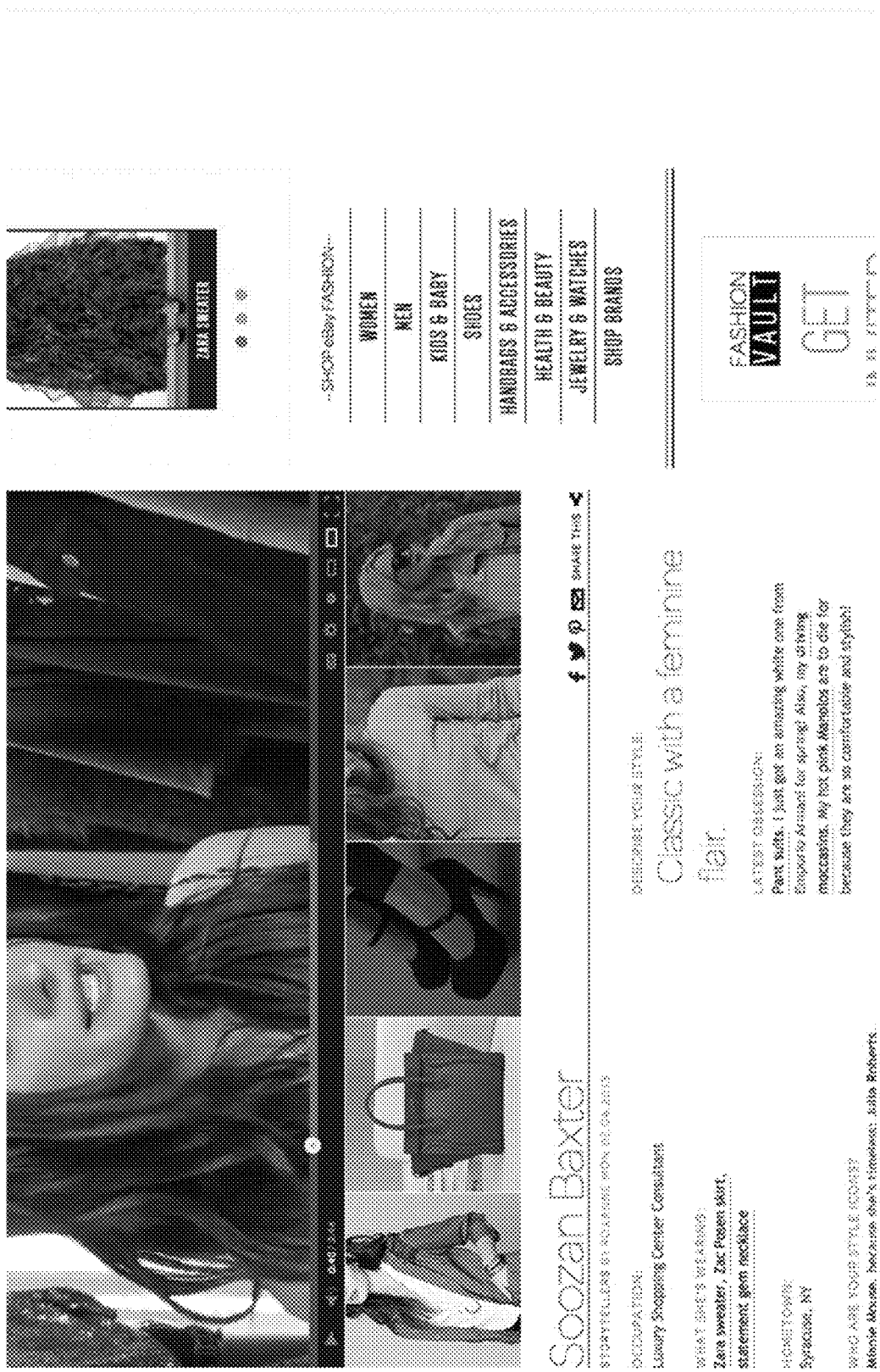

FIG. 10 illustrates an example portion of a user interface for a method for facilitating the obtaining of additional information relevant to items appearing or discussed in a video, and the shopping of the items, according to various example embodiments. The illustration of FIG. 10 depicts an example of how the user interface that comprises a shoppable video may be included in a web site (e.g., a fashion page within the electronic marketplace). For example, the shoppable video UI may be included in a blog or article that provides additional content related to the content of the video and to the images presented together with the video.

In some instances, the content of the video and/or of the images displayed together with the video may be the primary content of a curated content web site. The video (and the images) may tell a story about a person, a location, an event, etc. The additional content present on the particular page may provide information that is relevant to the video and/or the images, or that complements or completes the story. As shown in FIG. 10, the additional information displayed outside the shoppable video UI includes information about the person appearing in the video, such as the person's occupation, what she is wearing, hometown, who her style icons are, a description of her style, and latest fashion obsession. The additional information may include selectable links to other pages that facilitate shopping (e.g., links to shop eBay fashions for women, men, kids and baby, shows, handbags and accessories, health and beauty, jewelry and watches, shop brands, etc.)

Figure 11:
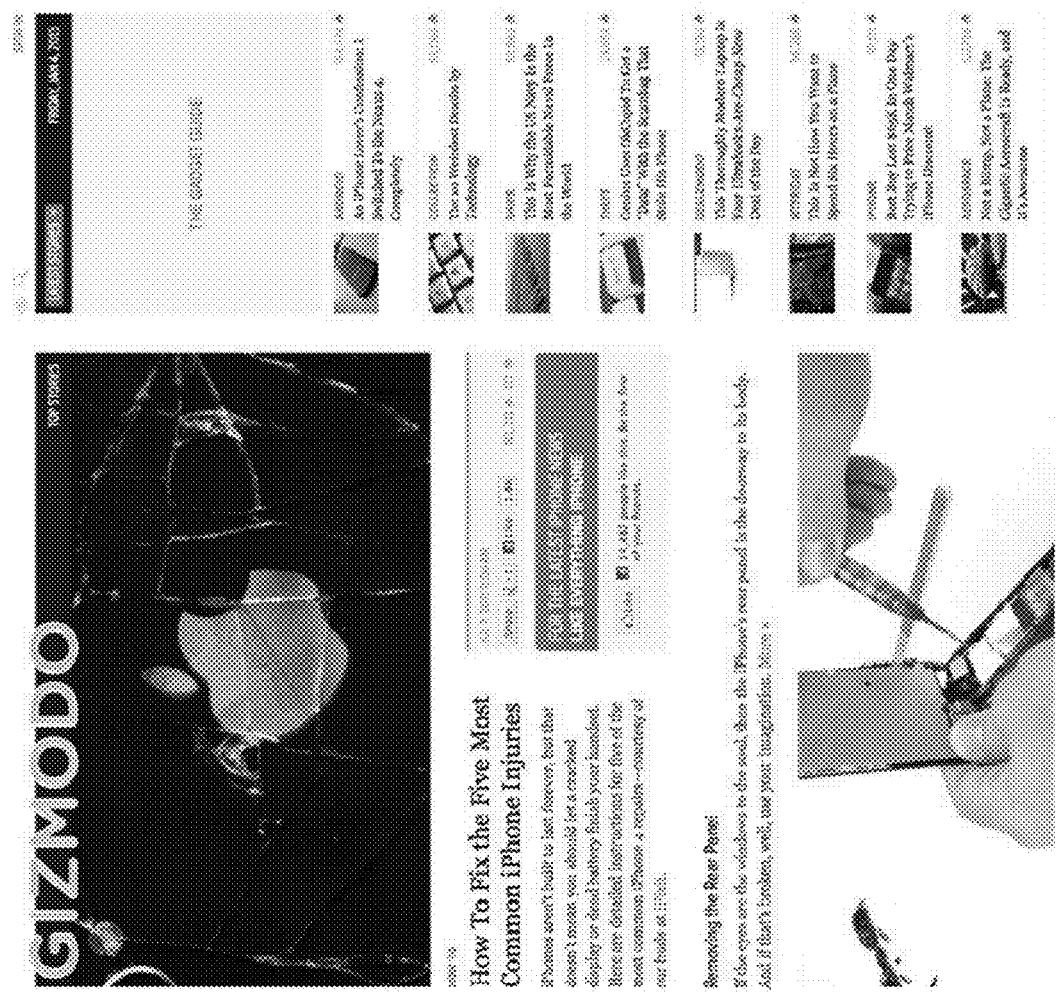
Figure 12:
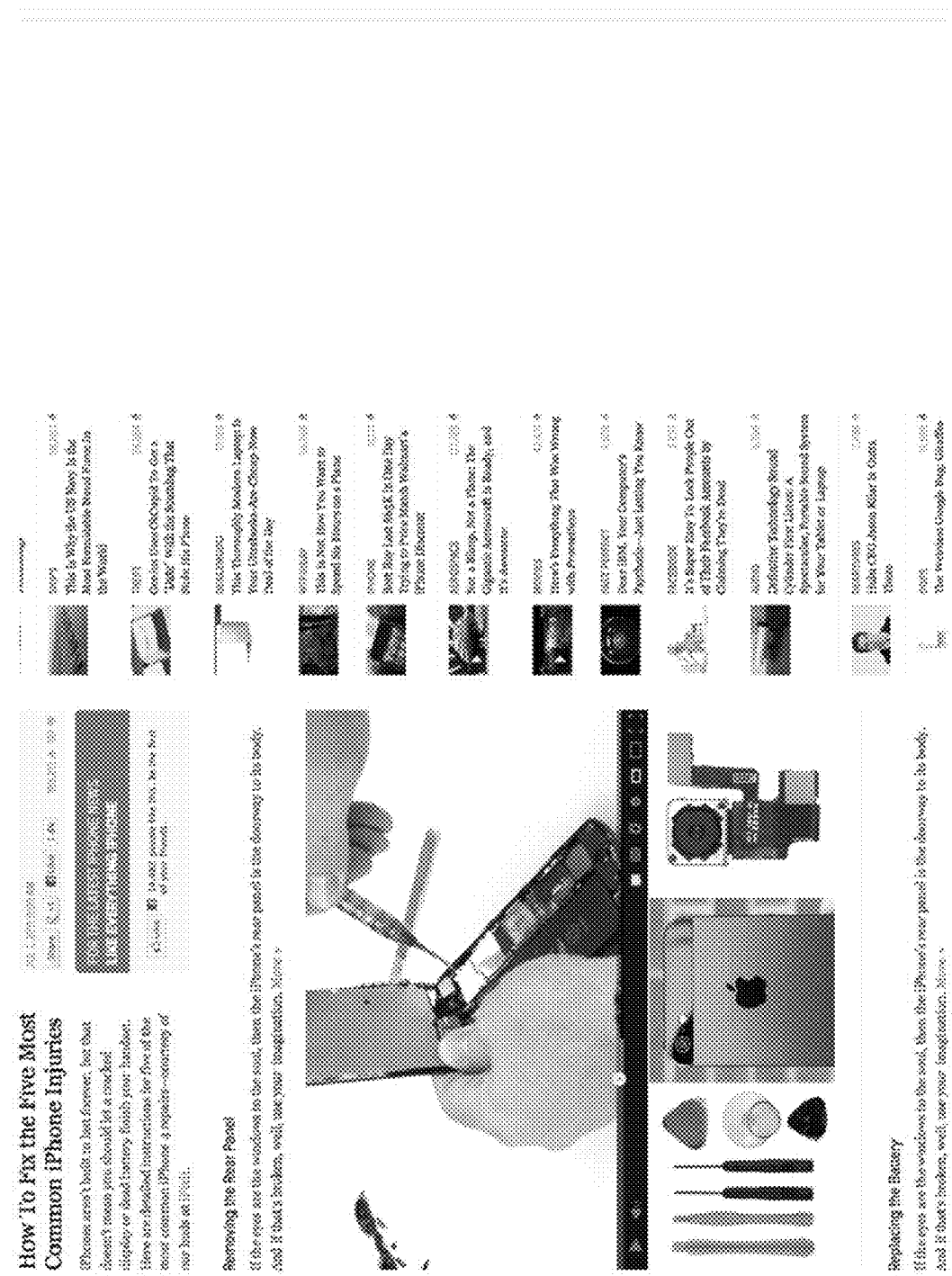

FIGS. 11-12 illustrate example portions of a user interface for a method for facilitating the obtaining of additional information relevant to items appearing or discussed in a video, and the shopping of the items, according to various example embodiments. The UI portions illustrated in FIGS. 11 and 12 depict an example how-to web page including a how-to article and a shoppable video UI included in the how-to web page.

As shown in FIG. 12, the user interface comprises a video player that plays a video ("How to fix the five most common iPhone injuries") and a plurality of images connected to the video based on time stamps that correspond to particular points in time in the video timeline. In this example, the images adjacent to the video player are stock photographs of products that appear or are discussed in the video. By selecting a particular image, the user may navigate to the portion of the video that displays the product depicted in the selected image. The user may further be provided the option to purchase the product on the electronic marketplace.

FIG. 13 illustrates an example of software code used to implement the video controlling and shopping system, according to various example embodiments. In some example embodiments, the video controlling and shopping system follows the current time of a video and changes the content of the pages (e.g., images) based on the time stamps. A user clicking on the elements within the page (e.g., sub-areas of the images) may allow the user to interact with the video and to control actions such as play, pause, and move the video's current time.

FIG. 14 illustrates an example of software code used to implement the video controlling and shopping system, according to various example embodiments. In some example embodiments, as shown in FIG. 14, the current time of the video may be followed, and the content of the video may be changed in response to receiving an indication of the time stamp of the image selected by the user from the plurality of images displayed together with (e.g., adjacent to) the video in the shoppable video UI. By selecting (e.g., clicking) on the images adjacent to the video, a user of the shoppable video UI may control video actions, such as playing, pausing, or moving the video's current time.

Figure 15:
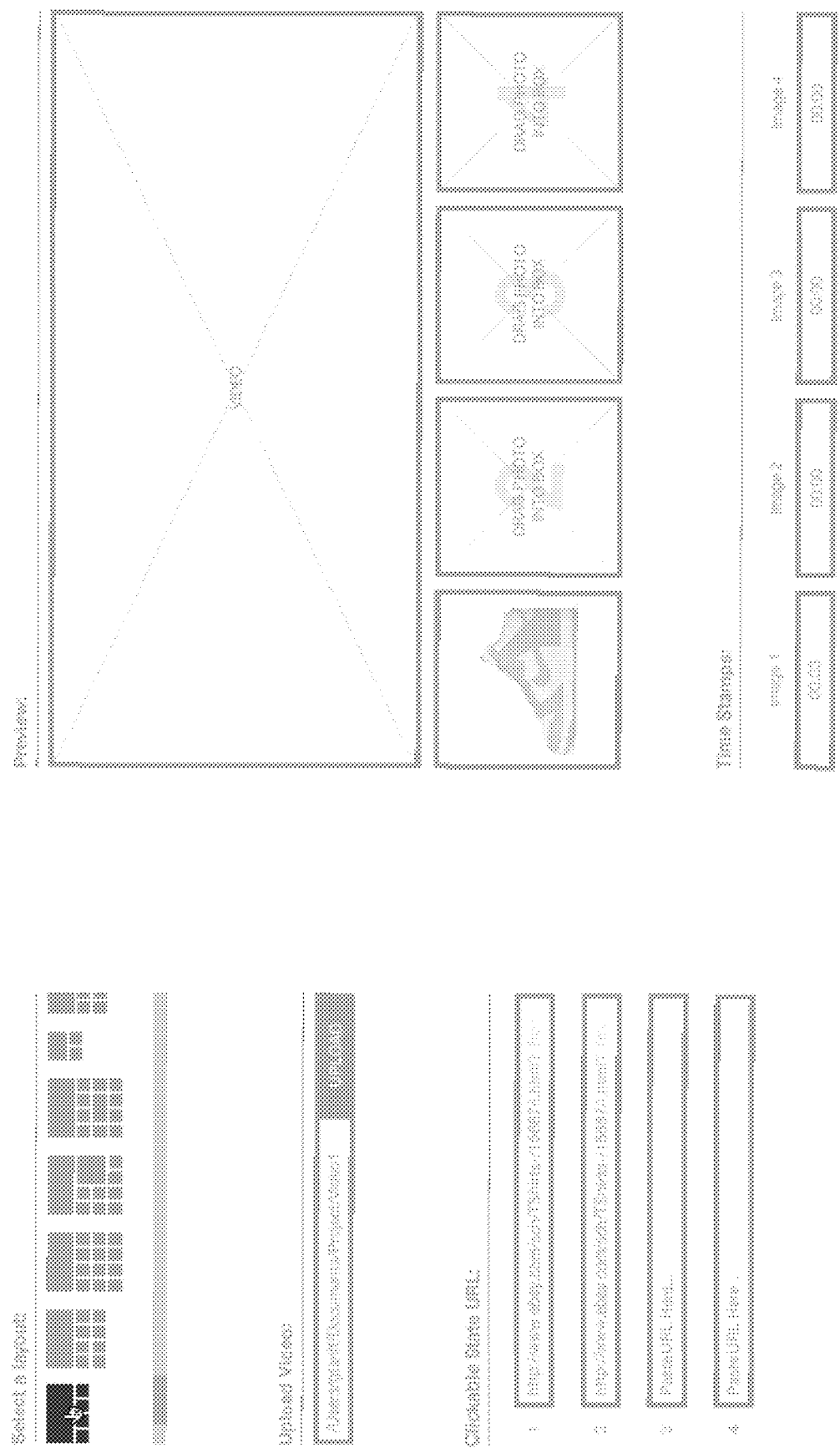
FIGS. 15-16 illustrate example portions of user interfaces for a tool for generating a shoppable video interface.

FIG. 15 illustrates an example portion of a user interface for a tool for generating a shoppable video user interface. In some example embodiments, a content curating user (also, "a curator") may provide input to the tool for generating a shoppable video UI and may request the generation of a shoppable video UI based on the provided input. The content curating user may provide the input using an example template illustrated in FIG. 15.

For example, using the template shown in FIG. 15, a content curating user (e.g., a seller, an administrator, etc.) may select a layout that indicates how the video and the item images should appear when displayed in a UI. The content curating user may select (or specify) a video and may upload the video to a server. Further, the content curating user may add (e.g., specify) the web address (e.g., URL) indicating where a user of the shoppable video UI is redirected upon clicking an image. The content curating user may drag and drop images (e.g., photos or screen shots) into the template and may add a time stamp for each image to indicate when each image appears in the video.

The content curating user may use the shoppable video UI in a variety of ways, as described herein. For example, a content curating user who is a seller of products on the electronic marketplace may request the display of the shoppable video UI on the seller's web site within the electronic marketplace.

Figure 16:
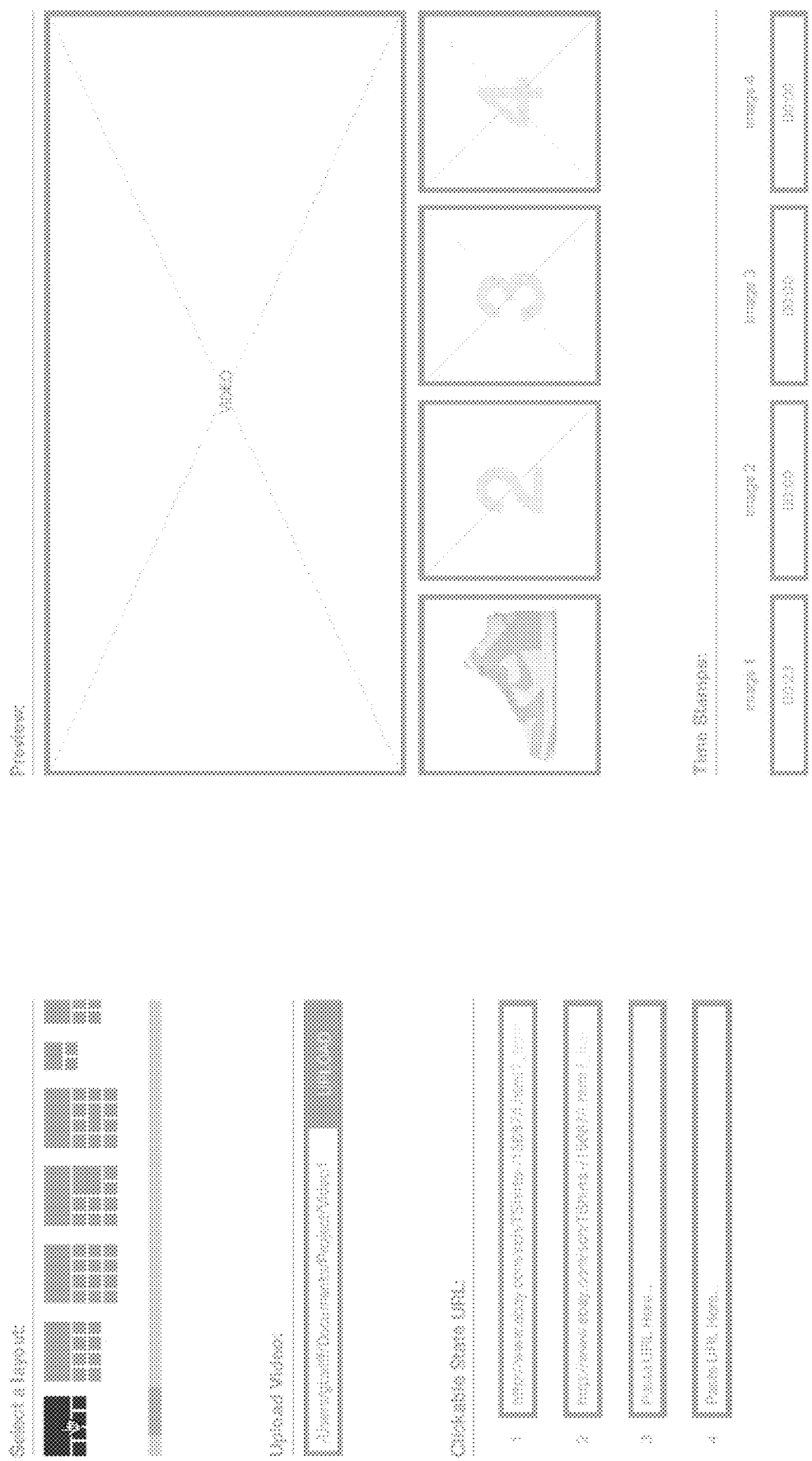

FIG. 16 illustrates an example portion of a user interface for a tool for generating a shoppable video user interface. In certain example embodiments, instead of having to individually add photos and corresponding time stamps, the curator may simply enter the time stamps, and the video controlling and shopping system may automatically take a screen shot of the video at the specified times and may automatically generate images needed for the thumbnail spots.

According to various example embodiments, the video controlling and shopping system receives input that includes a selection of a user interface layout that indicates an arrangement of a plurality of component parts of the user interface, an identification (e.g., an identifier such as a name) of a video, an identification (e.g., an identifier) of a time stamp in a timeline of the video, and an identification (e.g., an identifier such as a Universal Resource Locator (URL)) of a web address of a web site that includes content relevant to a segment of the video. The segment of the video may start at the time identified by the time stamp. Based on the input, the video controlling and shopping system may generate an image that includes a captured still image of the video that corresponds to the time stamp. The image may be related to the segment of the video or to the content relevant to the segment of the video.

The video controlling and shopping system may generate a first link between a first area of the image and a start of the segment of the video. The first area may be selectable by a user. A selection (e.g., by a user) of the first area may cause the issuing of a first command requesting a playing of the video starting at the time stamp.

The video controlling and shopping system may generate a second link between a second area of the image and the web address. The second area may be selectable by the user. A selection (e.g., by a user) of the second area may result in the issuing of a second command requesting a display of the web site based on the web address. The video controlling and shopping system may generate a user interface that includes the video and the images based on the user interface layout and the identification of the video.

According to some example embodiments, the video controlling and shopping system receives input that includes a selection of a user interface layout that indicates an arrangement of a plurality of component parts of the user interface, an identification (e.g., an identifier such as a name) of a video, an identification (e.g., an identifier) of a time stamp in a timeline of the video, and an identification (e.g., an identifier such as a Universal Resource Locator (URL)) of a web address of a web site that includes a listing of an item (e.g., a product or service) for sale. Based on the input, the video controlling and shopping system generates an image that includes a captured still image of the video that corresponds to a point in time in the video timeline identified by the time stamp. The image may include a depiction of the item. The video controlling and shopping system may generate a first link between a first portion of the image and the point in time in the video timeline that corresponds to the time stamp. The video controlling and shopping system may generate a second link between a second portion of the image and the web address. The video controlling and shopping system may generate a user interface that includes the video and the image based on the user interface layout and the identification of the video.

In some example embodiments, the video controlling and shopping system accesses, based on the input (e.g., provided by the curator), data that pertains to a video and data that pertains to an image. The image may be associated with a time stamp that identifies a point in time in the video. The image may be related to a content of the video at the time stamp. The video controlling and shopping system displays, based on the data that pertains to the video, the video in a first area of a user interface. The video controlling and shopping system displays, based on the data that pertains to the image, the image in a second area of the user interface. The second area may be adjacent to the first area. In some instances, the second area may overlap a portion of the first area.

Figure 17:
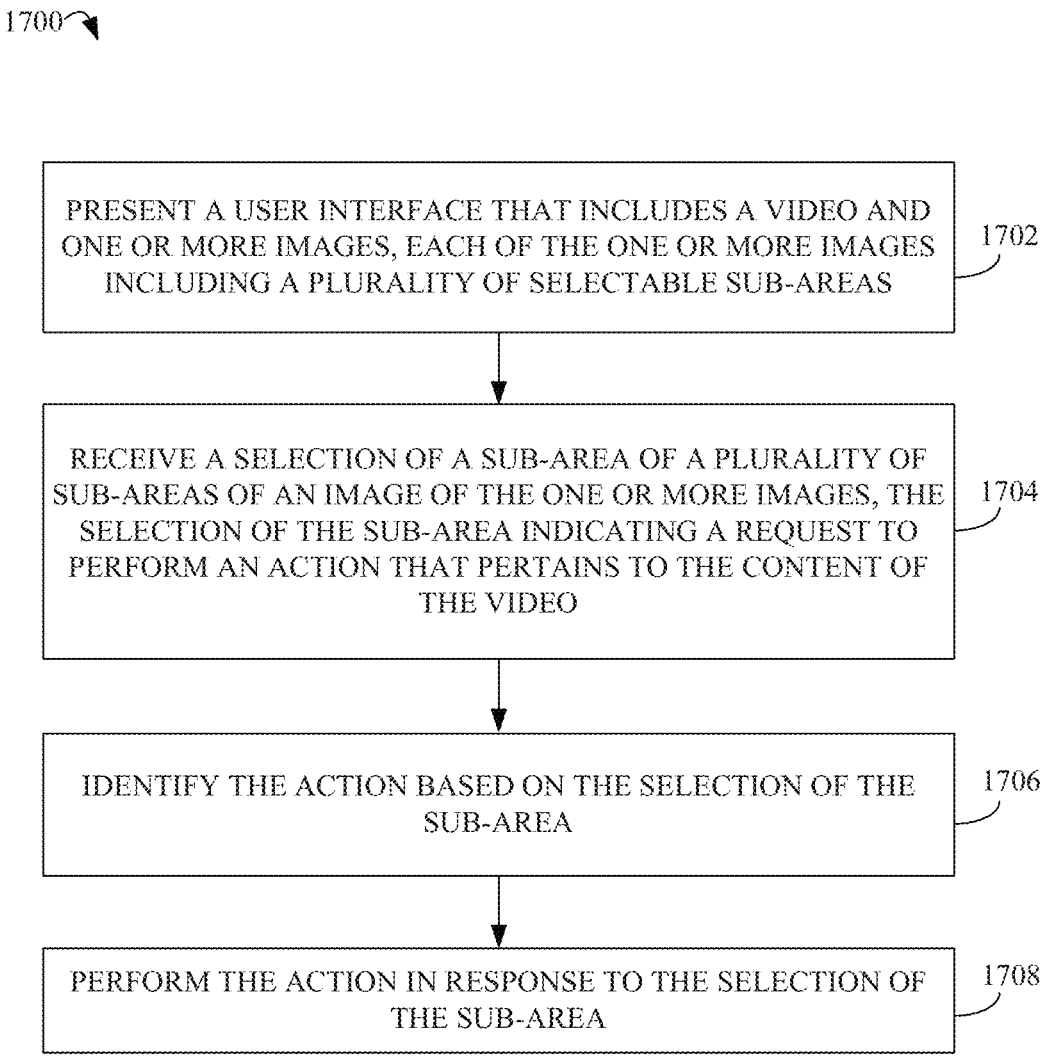
FIG. 17 is a flowchart illustrating an example method, according to various embodiments.

FIG. 17 is a flowchart illustrating an example method, according to various embodiments. The inventive subject matter may be implemented for use with applications that utilize any of a variety of network or computing models, to include web-based applications, client-server applications, or even peer-to-peer applications.

Consistent with some example embodiments, the method begins at method operation 1702, when a user interface that includes a video and one or more images is presented (e.g., to the user 214 via a client device associated with the user 214). Each of the one or more images may be related to the content of the video. Furthermore, each of the one or more images may include a plurality of selectable sub-areas.

At method operation 1704, a selection of a sub-area of the plurality of sub-areas of an image of the one or more images is received (e.g., from the client device associated with the user 214). The selection of the sub-area may indicate a request to perform an action that pertains to the content of the video. At method operation 1706, the action is identified based on the selection of the sub-area. For example, the selection by a user of a particular sub-area of a plurality of sub-areas of an image may indicate the user's intent to control the video playback. In contrast, the selection by the user of a different sub-area of the plurality of sub-areas of the image may indicate the user's desire to obtain additional information that pertains to the content of the video (e.g., obtain details about a product appearing in the video and/or purchase a product appearing in the video).

At method operation 1708, the action is performed in response to the selection of the sub-area. For example, in response to the selection by a user of a first sub-area of a plurality of sub-areas of a particular image, the video controlling and shopping system may play the video from a particular time stamp (in the timeline of the video) associated with the particular image. According to another example, in response to the selection by the user of a second sub-area of the plurality of sub-areas of the image, the video controlling and shopping system may display additional information that pertains to the content of the video at the time stamp associated with the particular image. In some instances, the video controlling and shopping system displays details about a product appearing in the video. In some instances, the video controlling and shopping system displays a seller's web site, or one or more listings of a product appearing in the video at the time stamp, to facilitate the user's purchase of the product.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
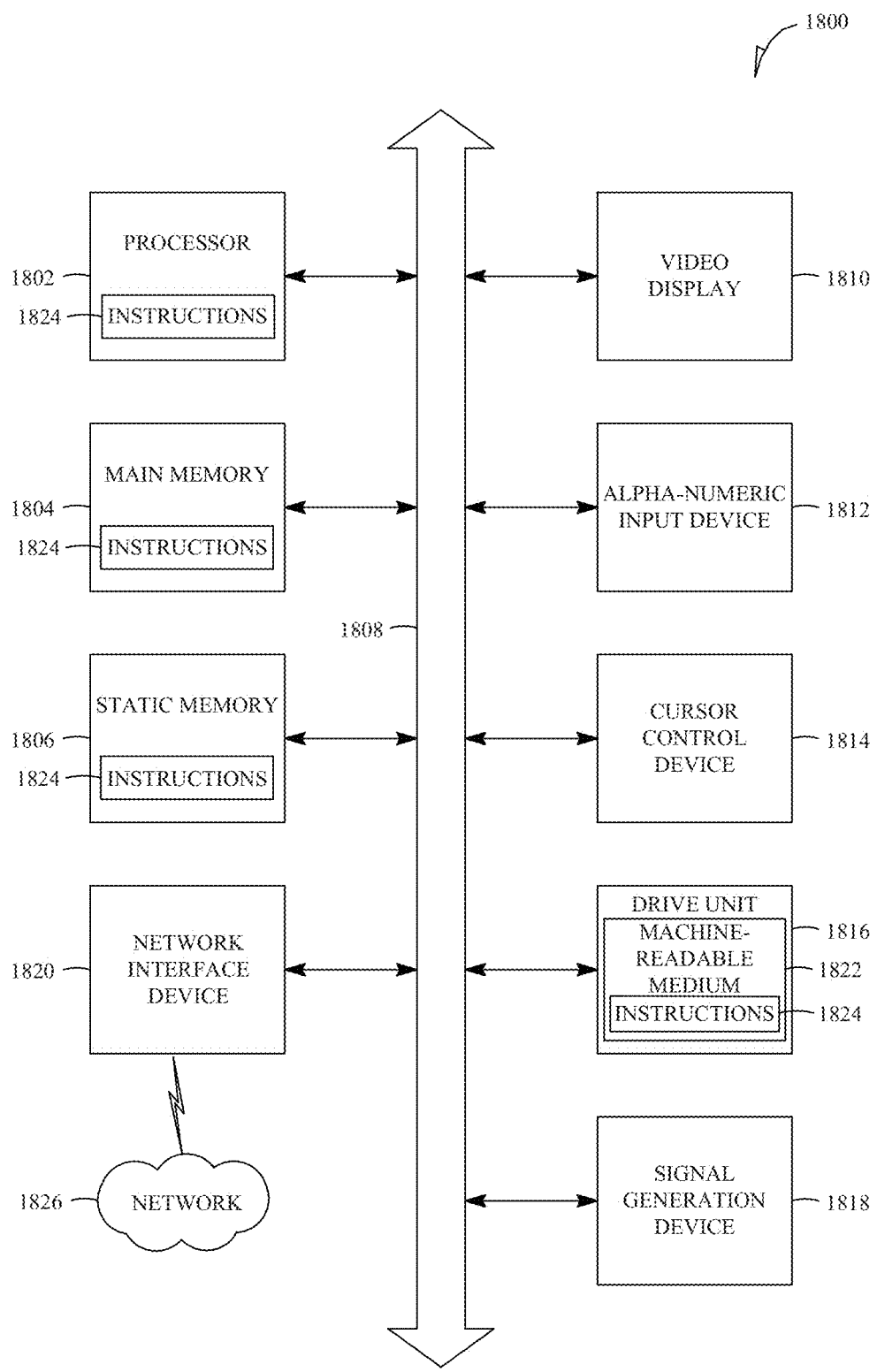
FIG. 18 is a diagrammatic representation of machine in the example form of a computer system within which a set of instructions, for causing the machine to perform any one or more of the methodologies discussed herein, may be executed.

FIG. 18 is a block diagram of machine in the example form of a computer system 1800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a cursor control device 1814 (e.g., a mouse), a drive unit 1816, a signal generation device 1818 (e.g., a speaker) and a network interface device 1820.

Machine-Readable Medium

The drive unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a non-transitory machine-readable medium for storing instructions that, when executed by one or more hardware processors of a machine, cause the one or more hardware processors to perform operations comprising:
   presenting, on a client device, a user interface that contemporaneously displays a video and one or more images, each of the one or more images displaying a particular frame from the video;
   tracking a pointer event that identifies a selection of an image of the one or more images in the user interface of the client device, the pointer event being associated with the client device;
   in response to the tracking of the pointer event, automatically altering, in the user interface of the client device, the image displaying the particular frame from the video by displaying a plurality of selectable sub-areas of the image adjacent to each other within the image such that the automatic altering of the image includes automatically displaying a first selectable sub-area of the plurality of selectable sub-areas within the image in the user interface of the client device, the first selectable sub-area corresponding to a playback option that associates the first selectable sub-area of the plurality of selectable sub-areas of the image with a particular time stamp of a timeline of the video, the automatic altering of the image further including automatically displaying, adjacent to the first selectable sub-area and within the image in the user interface of the client device, a second selectable sub-area of the plurality of selectable sub-areas, the second selectable sub-area corresponding to an additional content option that associates the second selectable sub-area with a link to a web page providing additional content pertaining to the image in the user interface of the client device;
   determining a selection of a particular selectable sub-area of the plurality of selectable sub-areas of the image in the user interface of the client device, the selection indicating a request to perform an action of a plurality of actions, the action pertaining to the content of the video, the action being associated with the particular selectable sub-area;
   identifying the action based on the particular selectable sub-area of the plurality of selectable sub-areas of the image; and
   performing the action in response to the selection of the particular selectable sub-area.

2. The system of claim 1, wherein each of the one or more images is associated with a corresponding time stamp of a timeline of the video, and wherein the identifying of the action comprises:
   determining that the selection of the particular selectable sub-area of the image indicates a request to control a playback of the video;
   identifying, based on the selection of the particular selectable sub-area of the image and on the determining that the selection of the particular selectable sub-area of the image indicates the request to control the playback of the video, the time stamp associated with the image; and
   playing the video starting at the time stamp in response to the selection of the particular selectable sub-area of the image.

3. The system of claim 1, wherein each of the one or more images is associated with a location of a source of additional information that is relevant to the content of the video, and wherein the identifying of the action comprises:
   determining that the selection of the particular selectable sub-area of the image indicates a request to obtain the additional information;
   identifying, based on the selection of the particular selectable sub-area of the image and on the determining that the selection of the particular selectable sub-area of the image indicates the request to obtain the additional information, the location of the source of additional information; and
   in response to the selection of the particular selectable sub-area of the image, displaying the additional information.

4. The system of claim 1, wherein the selection of the particular selectable sub-area of the image is received from the client device associated with a user, and wherein the operations further comprise:
   tracking an interaction by the user with one or more components of the user interface;
   determining, based on the interaction, that the user has an affinity for an item appearing in the video; and
   facilitating a communication with the user to provide additional information that is relevant to the affinity of the user for the item.

5. A method comprising:
   presenting, on a client device, a user interface that contemporaneously displays a video and one or more images, each of the one or more images displaying a particular frame from the video;

tracking a pointer event that identifies a selection of an image of the one or more images in the user interface of the client device, the pointer event being associated with the client device;

in response to the tracking of the pointer event, automatically altering, in the user interface of the client device, the image displaying the particular frame from the video by displaying a plurality of selectable sub-areas of the image adjacent to each other within the image such that the automatic altering of the image includes automatically displaying a first selectable sub-area of the plurality of selectable sub-areas within the image in the user interface of the client device, the first selectable sub-area corresponding to a playback option that associates the first selectable sub-area of the plurality of selectable sub-areas of the image with a particular time stamp of a timeline of the video, the automatic altering of the image further including automatically displaying, adjacent to the first selectable sub-area and within the image in the user interface of the client device, a second selectable sub-area of the plurality of selectable sub-areas, the second selectable sub-area corresponding to an additional content option that associates the second selectable sub-area with a link to a web page providing additional content pertaining to the image in the user interface of the client device, the altering being performed using one or more hardware processors;

determining a selection of a particular selectable sub-area of the plurality of selectable sub-areas of the image in the user interface of the client device, the selection indicating a request to perform an action of a plurality of actions, the action pertaining to the content of the video, the action being associated with the particular selectable sub-area;

identifying the action based on the particular selectable sub-area of the plurality of selectable sub-areas of the image; and performing the action in response to the selection of the particular selectable sub-area.

6. The method of claim 5, wherein:
each of the one or more images is associated with a corresponding time stamp of a timeline of the video; and
wherein the identifying of the action includes:
  determining that the selection of the particular selectable sub-area of the image indicates a request to control a playback of the video;
  identifying, based on the selection of the particular selectable sub-area of the image and on the determining that the selection of the particular selectable sub-area of the image indicates the request to control the playback of the video, the time stamp associated with the image; and
  playing the video starting at the time stamp in response to the selection of the particular selectable sub-area of the image.

7. The method of claim 5, further comprising:
identifying, based on the content of the video, additional information pertinent to the content of the video; and
automatically displaying the additional information in the user interface.

8. The method of claim 6, wherein:
the corresponding time stamp indicates a beginning of a particular segment of the video; and
wherein the playing of the video starting at the time stamp includes:
  identifying, based on the time stamp, the particular segment of the video that corresponds to the time stamp, and
  playing the particular segment of the video.

9. The method of claim 5, wherein each of the one or more images is associated with a location of a source of additional information that is relevant to the content of the video; and
wherein the identifying of the action comprises:
  determining that the selection of the particular selectable sub-area of the image indicates a request to obtain the additional information;
  identifying, based on the selection of the particular selectable sub-area of the image and on the determining that the selection of the particular selectable sub-area of the image indicates the request to obtain the additional information, the location of the source of additional information; and
  in response to the selection of the particular selectable sub-area of the image, displaying the additional information.

10. The method of claim 9, wherein:
the content includes an item appearing in the video; and
the additional information is pertinent to the item.

11. The method of claim 10, wherein the item includes the product and the additional information includes the listing of the instance of the product for sale on the electronic marketplace.

12. The method of claim 10, wherein the displaying of the additional information occurs concurrently with the item appearing in the video.

13. The method of claim 10, wherein the additional information includes a description of the item;
the method further comprising:
  facilitating a purchasing transaction that pertains to the item.

14. The method of claim 10, wherein the additional information includes a web site of a seller who sells the item.

15. The method of claim 5, wherein the image includes a captured still image of the video that corresponds to a point in time in a video timeline, the image including a depiction of an item.

16. The method of claim 5, wherein the selection of the particular selectable sub-area of the image is received from the client device associated with a user, the method further comprising:
  tracking an interaction by the user with one or more components of the user interface;
  determining, based on the interaction, that the user has an affinity for an item appearing in the video; and
  facilitating a communication with the user to provide additional information that is relevant to the affinity of the user for the item.

17. The method of claim 5, wherein each of the one or more images is associated with a corresponding time stamp of a timeline of the video and with a location of a source of additional information that is relevant to the content of the video, wherein the particular selectable sub-area is the first selectable sub-area of the plurality of selectable sub-areas of the image, wherein the selection of the particular selectable sub-area is a first selection of the first selectable sub-area, and wherein the method further comprises:
  determining that the first selection of the first selectable sub-area of the plurality of selectable sub-areas of the image indicates a request to control a playback of the video;
  identifying, based on the first selection of the first selectable sub-area and on the determining that the selection of the first selectable sub-area indicates the request to control the playback of the video, the time stamp being associated with the image;

the video is played starting at the time stamp in response to the first selection of the first selectable sub-area;

receiving a second selection of a second selectable sub-area of the plurality of selectable sub-areas of the image;

determining that the second selection of the second selectable sub-area indicates a request to obtain the additional information;

identifying the location of the source of the additional information based on the second selection of the second selectable sub-area and on the determining that the second selection of the second selectable sub-area indicates the request to obtain the additional information; and causing a display of the additional information in the user interface.

18. A non-transitory machine-readable medium comprising instructions that, when executed by one or more hardware processors of a machine, cause the one or more hardware processors to perform operations comprising:

presenting, on a client device, a user interface that contemporaneously displays a video and one or more images, each of the one or more images displaying a particular frame from the video;

tracking a pointer event that identifies a selection of an image of the one or more images in the user interface of the client device, the pointer event being associated with the client device;

in response to the tracking of the pointer event, automatically altering, in the user interface of the client device, the image displaying the particular frame from the video by displaying a plurality of selectable sub-areas of the image adjacent to each other within the image such that the automatic altering of the image includes automatically displaying a first selectable sub-area of the plurality of selectable sub-areas within the image in the user interface of the client device, the first selectable sub-area corresponding to a playback option that associates the first selectable sub-area of the plurality of selectable sub-areas of the image with a particular time stamp of a timeline of the video, the automatic altering of the image further including automatically displaying, adjacent to the first selectable sub-area and within the image in the user interface of the client device, a second selectable sub-area of the plurality of selectable sub-areas, the second selectable sub-area corresponding to an additional content option that associates the second selectable sub-area with a link to a web page providing additional content pertaining to the image in the user interface of the client device;

determining a selection of a particular selectable sub-area of the plurality of selectable sub-areas of the image in the user interface of the client device, the selection indicating a request to perform an action of a plurality of actions, the action pertaining to the content of the video, the action being associated with the particular selectable sub-area;

identifying the action based on the particular selectable sub-area of the plurality of selectable sub-areas of the image; and performing the action in response to the selection of the particular selectable sub-area.

* * * * *